United States Patent [19]

Tajima et al.

[11] Patent Number: 4,960,061
[45] Date of Patent: Oct. 2, 1990

[54] EMBROIDERING MACHINE

[75] Inventors: Ikuo Tajima; Hideo Hasegawa, both of Kasugai, Japan

[73] Assignee: Tokai Kogyo Mishin Kabushiki Kaisha, Kasugai, Japan

[21] Appl. No.: 212,701

[22] Filed: Jun. 28, 1988

[30] Foreign Application Priority Data

Jun. 29, 1987 [JP] Japan ................................ 62-159880
Feb. 17, 1988 [JP] Japan ................................ 63-32825

[51] Int. Cl.$^5$ .......................................... D05B 21/00
[52] U.S. Cl. .................................. 112/103; 112/445; 112/121.12
[58] Field of Search ........... 112/103, 102, 445, 121.12, 112/121.11, 266.1, 262.3, 453, 86, 78, 98, 454, 456, 458; 364/470

[56] References Cited

U.S. PATENT DOCUMENTS

| | | | |
|---|---|---|---|
| 4,502,402 | 3/1985 | Kato | 112/456 X |
| 4,577,574 | 3/1986 | Takahashi | 112/445 |
| 4,622,907 | 11/1986 | Kimura | 112/445 X |
| 4,704,974 | 11/1987 | Herdeg et al. | 112/445 X |
| 4,763,586 | 8/1988 | Takenoya et al. | 112/103 |
| 4,821,662 | 4/1989 | Pongrass et al. | 112/103 X |
| 4,823,714 | 4/1989 | Yokoe et al. | 112/121.12 X |

*Primary Examiner*—Peter Nerbun
*Attorney, Agent, or Firm*—Spensley Horn Jubas & Lubitz

[57] ABSTRACT

In an automatic embroidering machine generally, stitch data for realizing an embroidering operation corresponding to a desired embroidery design is stored in a stitch data memory, the stitch data is read from this memory and the embroidering operation is executed in accordance with the read out stitch data. The stitch data includes data representing X, Y moving amounts of an embroidery frame for each stitch. In the embroidering machine according to the present invention, graphic pattern data of a desired embroidery design stored in this stitch data memory is supplied and displayed by a display device. Thus, display of the embroidery design for confirmation can be readily made without actually performing the embroidering operation. Besides, frame graphic pattern data for graphically displaying the shape of an embroidery frame is supplied and displayed by the display device. By displaying the embroidery design pattern and the embroidery frame together, whether or not the embroidery design fits in the embroidery frame can be detected. This detection may be automatically made on the basis of the pattern data of the design pattern and the frame pattern. Further, as the embroidering operation advances, graphic pattern data of a finished portion of the embroidery design is supplied and displayed by the display device.

14 Claims, 20 Drawing Sheets

DESIGN GRAPHIC PATTERN MEMORY GPM

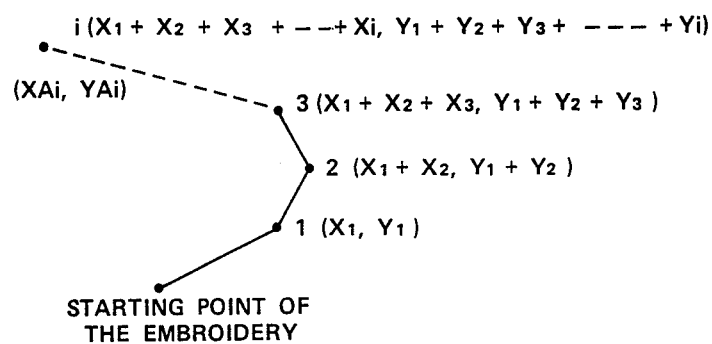
FIG.5
FIG.6a
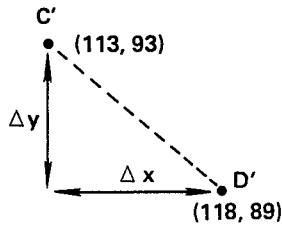
FIG.6b
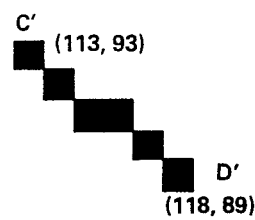
FIG.6c
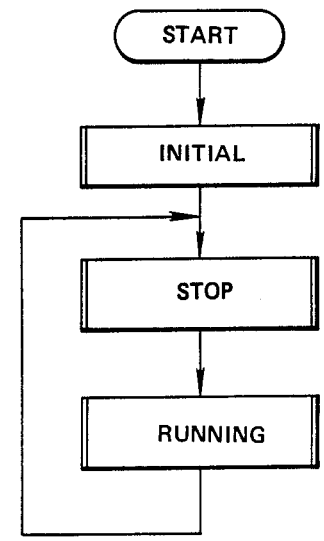
FIG.7

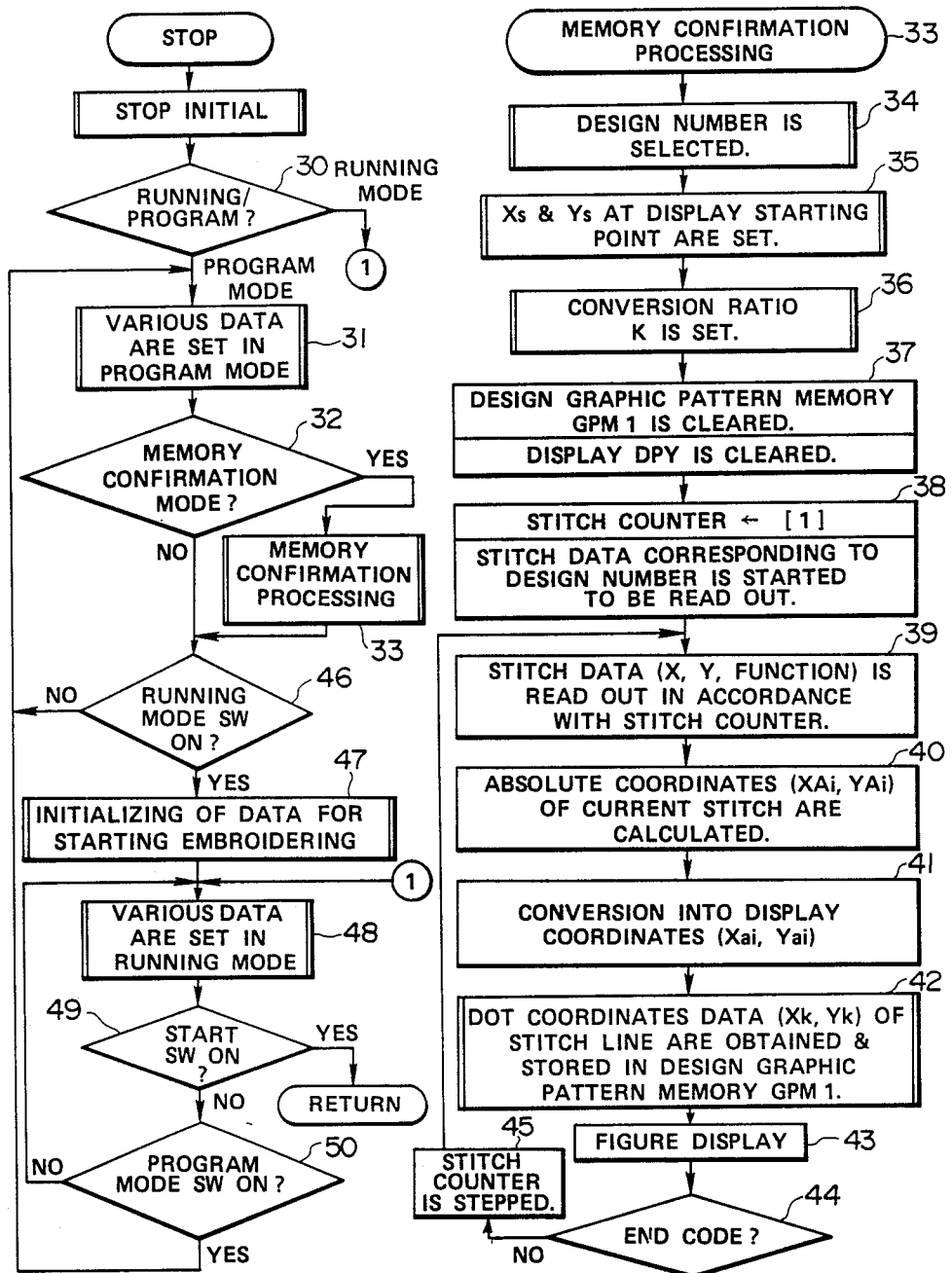

FIG.10 a

```
PROGRAM MODE

F K:MEMORY  F L:PARAM.  F M:MEMORY  F N:SOFT   F         F
1 EDITION   2 SET       3 CONFIRM.  4 FRAME    5         6 NEXT
```

FIG.10 b

```
MEMORY CONFIRMATION MODE :
   DESIGN NO. :   0 0
```

FIG.10 c

```
MEMORY CONFIRMATION MODE :
    DESIGN NO. :   0 2
    START X    :   6 3
```

FIG.10 d

```
MEMORY CONFIRMATION MODE :
  DESIGN NO. :    0 2
  START    X :    6 3
         Y :     6 3
```

FIG.10 e

```
MEMORY CONFIRMATION MODE :
    DESIGN NO. :   0 2
    START X    :   6 3
          Y    :   6 3
    RATIO      :   1/10
```

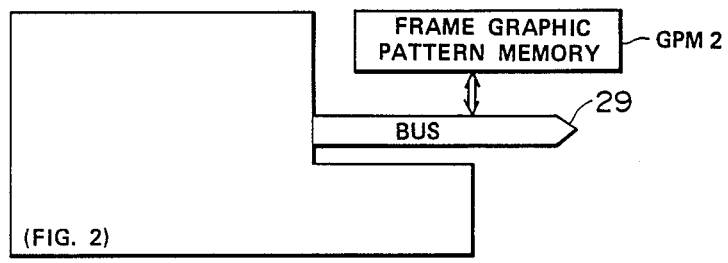
FIG.11
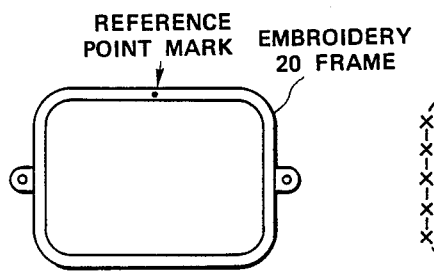
FIG.12 a
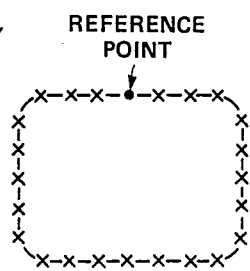
FIG.12 b
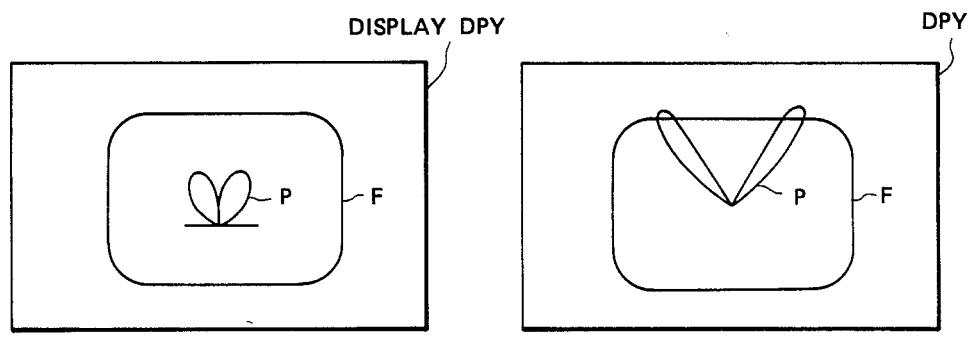
FIG.13 a   FIG.13 b

```
                                    ┌ DPY
┌──────────────────────────────────────────┐
│ PROGRAM MODE                             │
│                                          │
│                                          │
├──────┬──────┬──────┬──────┬───┬──────────┤
│F K:MEM│F L:PARAM│F M:MEMORY│F N:SOFT│F│   │
│       │         │          │        │ │NEXT│
│1EDITION│2 SET   │3 CONFIRM │4 FRAME │5│6  │
└──────┴──────┴──────┴──────┴───┴──────────┘
```
FIG.16a

```
                          ┌ DPY
┌──────────────────────────────────┐
│ SOFT FRAME LIMIT MODE :          │
│    DESIGN NO. :   ¿0¿ 0¿         │
│                                  │
├───┬───┬───┬───┬───┬──────────────┤
│   │   │   │   │   │              │
└───┴───┴───┴───┴───┴──────────────┘
```
FIG.16b

```
                          ┌ DPY
┌──────────────────────────────────┐
│ SOFT FRAME LIMIT MODE:           │
│    DESIGN NO.:    0 2            │
│    START X  :    ¿6¿3¿           │
├───┬───┬───┬───┬───┬──────────────┤
│   │   │   │   │   │              │
└───┴───┴───┴───┴───┴──────────────┘
```
FIG.16c

```
                          ┌ DPY
┌──────────────────────────────────┐
│ SOFT FRAME LIMIT MODE :          │
│ DESIGN NO. :    0 2              │
│  START    X :   6 3              │
│           Y :  ¿6¿3¿             │
├───┬───┬───┬───┬───┬──────────────┤
│   │   │   │   │   │              │
└───┴───┴───┴───┴───┴──────────────┘
```
FIG.16d

```
                          ┌ DPY
┌──────────────────────────────────┐
│ SOFT FRAME LIMIT MODE :          │
│    DESIGN NO.:    0 2            │
│    START X  :    6 3             │
│          Y  :    6 3             │
│    RATIO    :   ¿1/10¿           │
├───┬───┬───┬───┬───┬──────────────┤
│   │   │   │   │   │              │
└───┴───┴───┴───┴───┴──────────────┘
```
FIG.16e

EMBROIDERING MACHINE

BACKGROUND OF THE INVENTION

This invention relates to an embroidering machine and, more particularly, to an embroidering machine in which, in correspondence to stitch data for realizing an embroidering operation, graphic pattern data of an embroidery design realized by this stitch data is produced and a pattern of the embroidery design is displayed in accordance with this graphic pattern data whereby display for confirmation of the embroidery design pattern corresponding to this stitch data is facilitated.

The invention relates also to an embroidering machine capable of judging whether or not an embroidery design fits in an embroidery frame by displaying both the shape of the embroidery frame and the shape of the embroidery design.

The invention relates also to a control device in an embroidering machine and, more particularly, to a control device capable of storing and displaying, in correspondence to stitch data for realizing an embroidering operation, control data representing characteristics of the embroidery design corresponding to the stitch data.

The invention relates also to an embroidering machine capable of graphically displaying a finished portion of an embroidery design pattern as the embroidering operation advances.

In an automatic embroidering machine, stitch data corresponding to various embroidery designs are stored in an external memory device such as a paper tape, the external memory device such as paper tape storing stitch data corresponding to a desired embroidery design is set and this stitch data is transmitted to an internal memory and stored therein. Data stored in the external memory such as paper tape as data relating to the embroidery design in the prior art embroidering machine is only stitch data for realizing embroidering operation corresponding to the embroidery design and this stitch data is directly transmitted to the internal memory and stored therein. In the automatic embroidering machine, stitch data transmitted to the internal memory and stored therein is read out and the embroidering operation is executed in accordance with the read out stitch data.

Since in such prior art embroidering machine, the memory is adapted to store only stitch data which is actually necessary for realizing the embroidering operation of the embroidery design, there is no means for confirming what design (i.e., its design pattern and design characteristics) is the embroidery design corresponding to the stitch data once stored in the internal memory for universal uses other than the operator's personal memory or actually carrying out the embroidery. This requires a very long time for confirmation of the embroidery design pattern and therefore is very inconvenient.

The embroidering machine generally has four limit switches concerning +X, −X and +Y and −Y directions for limiting X, Y moving range of the embroidery frame within a predetermined range and, when this limit switch has detected a supporting body of the embroidery frame, running of the embroidering machine is stopped for preventing damage to the embroidering machine.

If the shape of the embroidery frame supported by the embroidery frame supporting body is square matching with the shape of the supporting body, there is no particular problem. There is, however, a case where the shape of the embroidery frame is an ellipse or a circle and, in this case, there occurs an area in which the limit switches cannot detect the embroidery frame supporting body despite the fact that the needle position is out of the embroidery frame. If a portion of the embroidery design is located in such area, the needle sometimes abuts against the embroidery frame and thereby damages the embroidering machine due to nonstopping of the embroidering machine.

For overcoming this problem, Japanese Preliminary Patent Publication No. 59-106557 discloses the art in which the shape of the embroidery frame is obtained by polar coordinate data from a suitable origin before starting of embroidery and, during the embroidering operation, an absolute position of needle position for each stitch in the embroidery design is obtained by polar coordinates in accordance with stitch data for each stitch and, on the basis of comparison of the polar coordinate data of this needle position with the polar coordinate data of the embroidery frame, running of the embroidering machine is stopped when the needle position is on or out of the embroidery frame.

In this prior art embroidering machine, such judgement processing must be made during stitching operation for each stitch in the embroidering operation so that running for the embroidery must be actually made for judging whether or not the embroidery design is out of the embroidery frame. This is very inconvenient and troublesome.

Further, in the prior art embroidering machine, no particular means is provided for informing the operator of state of progress of the embroidering operation during the embroidering operation.

For this reason, the operator finds it difficult to confirm how far the embroidering operation has proceeded. If there is a sample of design pattern showing the entire embroidery design to be embroidered, state of progress of the embroidering operation can be confirmed by comparing the embroidery design which has actually been finished with the sample of design pattern. This, however, requires much time and labor.

SUMMARY OF THE INVENTION

It is, therefore, an object of the invention to provide an embroidering machine capable of facilitating display for confirmation of an embroidery design pattern corresponding to stitch data by producing, in correspondence to stitch data for realizing an embroidering operation, graphic pattern data of the embroidery design pattern corresponding to this stitch data and displaying the embroidery design pattern in accordance with this graphic pattern data.

It is another object of the invention to provide an embroidering machine capable of judging, before starting embroidering of a desired embroidery design, whether or not the embroidery design fits in the embroidery frame.

It is still another object of the invention to provide an embroidering machine capable of storing and displaying control data representing characteristics of an embroidery design corresponding to stitch data for realizing an embroidering operation.

It is still another object of the invention to provide an embroidering machine capable of informing the operator of state of progress of the embroidering operation in a simple manner by graphically displaying a finished portion of an embroidery design pattern as the embroidering operation advances.

For achieving the above described object, the embroidering machine including stitch data memory means storing stitch data for realizing an embroidering operation corresponding to a desired embroidery design and means for reading out the stitch data from this stitch data memory means and executing the embroidering operation in accordance with the read out stitch data characerized in that said embroidering machine comprises graphic pattern data supply means for supplying, in correspondence to an embroidery design stored in said stitch data memory means, graphic pattern data of pattern of the embroidery design and display means for displaying the embroidery design pattern in accordance with the graphic pattern data supplied by this graphic pattern data supply means.

Thus, by displaying the embroidery design pattern by the display means, display of the embroidery design pattern for confirmation can be readily made without carrying out actual embroidering operation.

For achieving the second object, the embroidering machine according to the invention is characterized in that it further comprises frame graphic pattern data supply means for supplying frame graphic pattern data for graphically displaying the shape of an embroidery frame and said display means displays the embroidery design pattern and the embroidery frame shape in accordance with the graphic pattern data of the embroidery design supplied by said graphic pattern data supply means and the frame pattern data supplied by said frame graphic pattern data supply means whereby whether or not the embroidery design pattern fits in the embroidery frame can be detected by comparison of the embroidery design pattern and the embroidery frame shape respectively displayed by said display means.

Since the embroidery design pattern and the embroidery frame shape are displayed by the display means and whether or not the embroidery design fits in the embroidery frame can be judged by comparing them, whether or not the embroidery design will be out of the embroidery frame can be judged by the previously made display without performing actual embroidering operation.

For achieving the second object of the invention, the embroidering machine may further comprise judging means for comparing the graphic pattern data of the embroidery design supplied by said graphic pattern data supply means and the frame graphic pattern data supplied by said frame graphic pattern data supply means so as to judge whether or not the embroidery design pattern fits in the embroidery frame. Since whether or not the embroidery design fits in the embroidery frame can be automatically judged, whether or not the embroidery design will be out of the embroidery frame can be judged without performing actual embroidering operation.

For achieving the third object, the embroidering machine according to the invention is characterized in that it comprises graphic pattern data supply means for supplying graphic pattern data of a finished portion of an embroidery design as the embroidering operation advances and display means for displaying the finished portion of the embroidery design in accordance with the graphic pattern data supplied by this graphic pattern data supply means. The operator can instantly confirm the finished portion of the embroidery design by watching the display by the display means and also confirm how far the embroidering operation has proceeded.

The display means may display both the finished portion of the embroidery design pattern and the entire pattern of the embroidery design together. By watching both the entire pattern of the embroidery design and the finished portion of the embroidery design pattern together, the operator can instantly confirm how far the embroidering operation has proceeded in the entire amount of the embroidery.

The state of progress of the embroidering operation in the entire amount of embroidery can be confirmed also by providing means for displaying information informing the operator of a finished amount of embroidery or unfinished amount of embroidery in the entire amount of embroidery. In this case, the embroidery amounts may be expressed by, for example, specific number of stitches or rough number of stitches.

For achieving the fourth object, the embroidering machine according to the invention is characterized in that it comprises control data memory means for storing control data representing characteristics of an embroidery design corresponding to the stitch data stored in said stitch data memory means, setting means for setting contents of the control data to be stored in this control data memory means, reading means for reading out the control data from said control data storing means and display means for displaying the read out control data.

This control data is not directly related to the stitching operation and the stitching operation can be executed without this data. The control data, however, is useful information for informing the operator of characteristics of the embroidery design in some form. As useful data for registering as the control data, there are for example "design name data" representing the name of embrodiery design corresponding to the stitch data, "total stitch number data" representing the number of stitches in the embroidery design, "color change number data" representing the number of times thread color is changed and "maximum range data" representing the maximum range from the embroidery starting point in the embroidery design. The control data is not limited to this but other suitable data may be registered as the control data.

The manner of setting the control data by the setting means may be manual setting or automatic setting. For example, the setting means may comprise manual setting means for manually setting contents of predetermined type of control data among plural types of control data as desired and automatic setting means for automatically setting contents of another predetermined type of control data among the plural types of control data in accordance with contents of the stitch data corresponding to the other predetermined type of control data by performing a predetermined operation. In this case, the "design name data" is preferably set in such a manner that a desired name is set by the operator by operating the manual setting means. The "total stitch number data", "color change number data" and "maximum range data" are preferably set automatically by performing a predetermined operation by the automatic setting means in accordance with contents of stitch data.

Preferred embodiments of the invention will now be described in conjuntion with the accompanying drawings.

BRIEF DESCRIPTION OF THE DRAWINGS

In the accompanying drawings,

FIG. 5 is a diagram showing an example of absolute coordinates of an embroidery design;

FIG. 6a is a diagram showing an example of one stitch line between adjacent needle points, FIG. 6b is a diagram showing dot coordinate positions in the display device corresponding to the two adjacent needle points in FIG. 6a and FIG. 6c is a diagram showing a dot pattern coordinate position corresponding to the stitch line connecting the coordinate positions of FIG. 6b;

FIG. 7 is a flow chart showing a main routine of a program executed by a microcomputer in FIG. 2;

FIG. 8 is a flow chart showing an example of embroidering machine main shaft stop routine in the main routine of FIG. 7;

FIG. 9 is a flow chart showing an example of memory confirmation processing routine in FIG. 8;

FIGS. 10a–10e are diagrams showing examples of display in the display device when the processings of FIG. 9 are executed;

FIG. 11 is a block diagram showing a hardware structure which schematically shows a control system of another embodiment of the automatic embroidering machine according to the invention;

FIG. 12a is a plan view showing an example of an actual shape of an embroidery frame and FIG. 12b is a view for explaining the shape of the embroidery frame in the form converted to stitch pattern;

FIGS. 13a and 13b are diagrams showing an example of each of the embroidery frame shape and the embroidery design pattern displayed by the display device;

FIGS. 16a–16e are diagrams showing examples of display by the display device when the processings of FIG. 15 are executed;

DESCRIPTION OF PREFERRED EMBODIMENTS

Figure 1A:
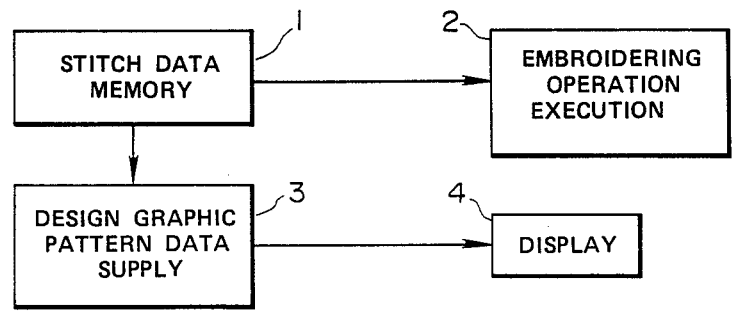
FIGS. 1a–1e are block diagrams showing general schemes of the embroidering machine according to the invention.

FIG. 1a shows general scheme of an embodiment relating to display of an embroidery design pattern. Stitch data memory means 1 stores stitch data for realizing an embroidering operation corresponding to a desired embroidery design. Embroidering operation execution means 2 reads out the stitch data from this stitch data memory means 1 and executes the embroidering operation in accordance with the read out stitch data. Design graphic pattern data supply means 3 supplies, in correspondence to an embroidery design stored in the stitch data memory means 1, graphic pattern data of pattern of the embroidery design. Display means 4 displays the embroidery design pattern in accordance with the graphic pattern data supplied by this graphic pattern data supply means. Thus, display for confirmation of the embroidery design can be readily made without actually carrying out the embroidery operation.

Figure 1B:
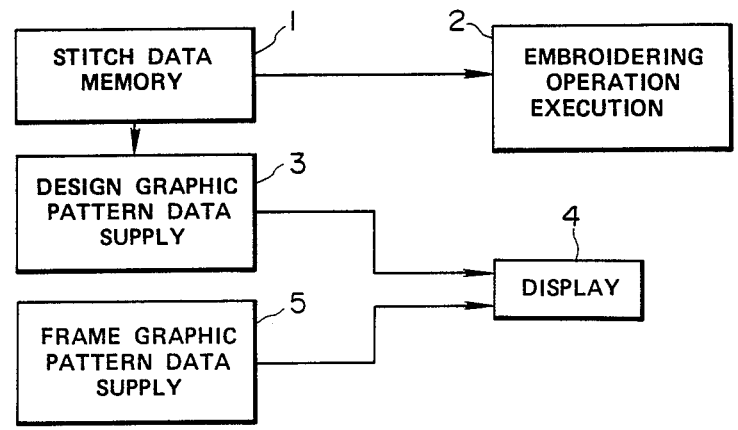
Figure 1C:
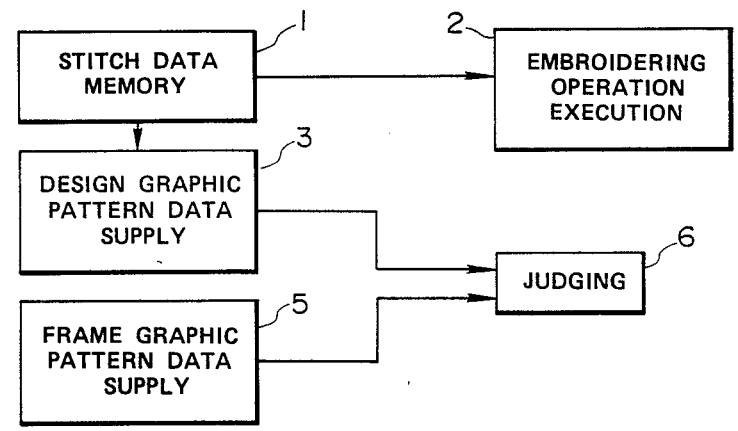

FIGS. 1b and 1c show general schemes of an embodiment relating to display of the embroidery design pattern and the embroidery frame shape. Frame graphic pattern data supply means 5 supplies frame graphic pattern data for graphically displaying the shape of an embroidery frame. Display means 4 displays the embroidery design pattern and the embroidery frame shape in accordance with the graphic pattern data of the embroidery design supplied by the design graphic pattern data supply means 3 and the frame pattern data supplied by the frame graphic pattern data supply means 5. Whether or not the embroidery design pattern fits in the embroidery frame can be detected by comparison of the embroidery design pattern and the embroidery frame shape respectively displayed by the display means 4.

As shown in FIG. 1c, judging means 6 may be provided for comparing the design graphic pattern data supplied by the design graphic pattern data supply means 3 and the frame graphic pattern data supplied by the frame graphic pattern data supply means 5 so as to judge automatically whether or not the embroidery design pattern fits in the embroidery frame. In this case, the embroidery design pattern and the embroidery frame shape may be displayed or may not be displayed by the display means 4.

Figure 1D:
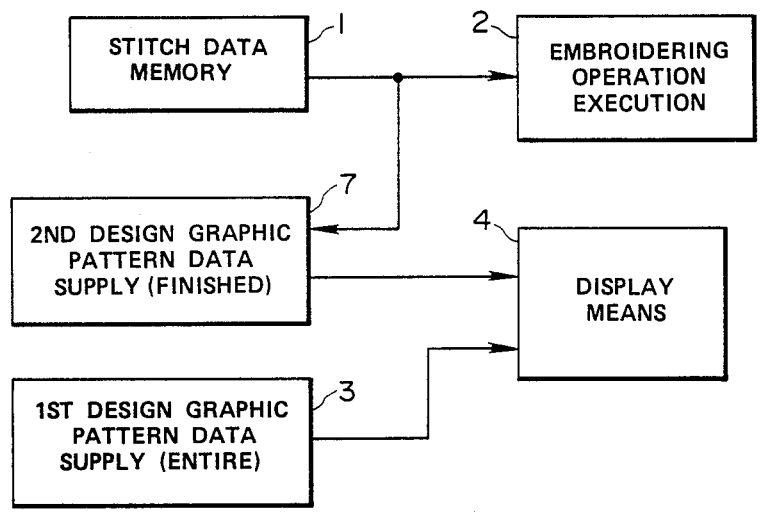

FIG. 1d shows general scheme of an embodiment for displaying an embroidery design pattern which is being completed during the embroidering operation. Second design graphic pattern data supply means 7 supplies graphic pattern data of a finished portion of the embroidery design as the embroidering operation advances. Display means 4 displays the finished portion of the embroidery design pattern in accordance with the graphic pattern data supplied by this design graphic pattern data supply means 7. The display means 4 may display the entire pattern of the embroidery design also in accordance with the pattern data of the entire pattern of the embroidery design which is supplied from the first design graphic pattern data supply means 3 before starting of the embroidering operation.

Figure 1E:
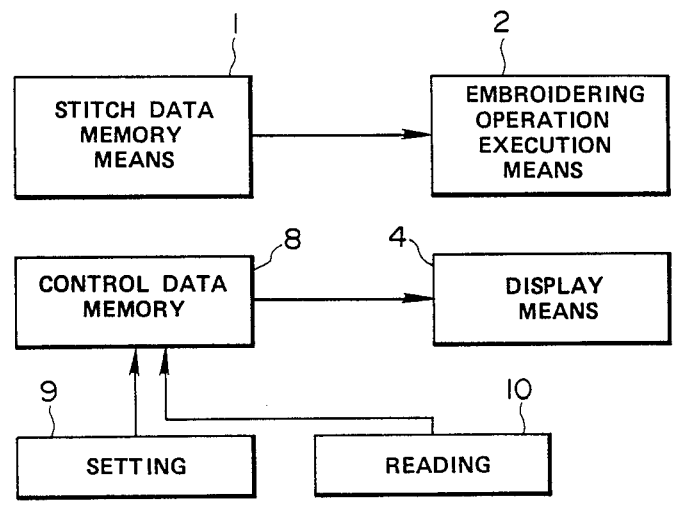

FIG. 1e shows general scheme of an embodiment capable of storing and displaying, in correspondence to stitch data for realizing an embroidering operation, control data representing characteristics of the embroidery design corresponding to the stitch data. Control data memory means 8 stores control data representing characteristics of the embroidery design corresponding to the stitch data stored in the stitch data memory means 1. Setting means 9 sets contents of the control data to be stored in this control data memory means 8. Reading means 10 reads out the control data from the control data storing means 8. Display means 4 displays the read out control data.

Figure 2:
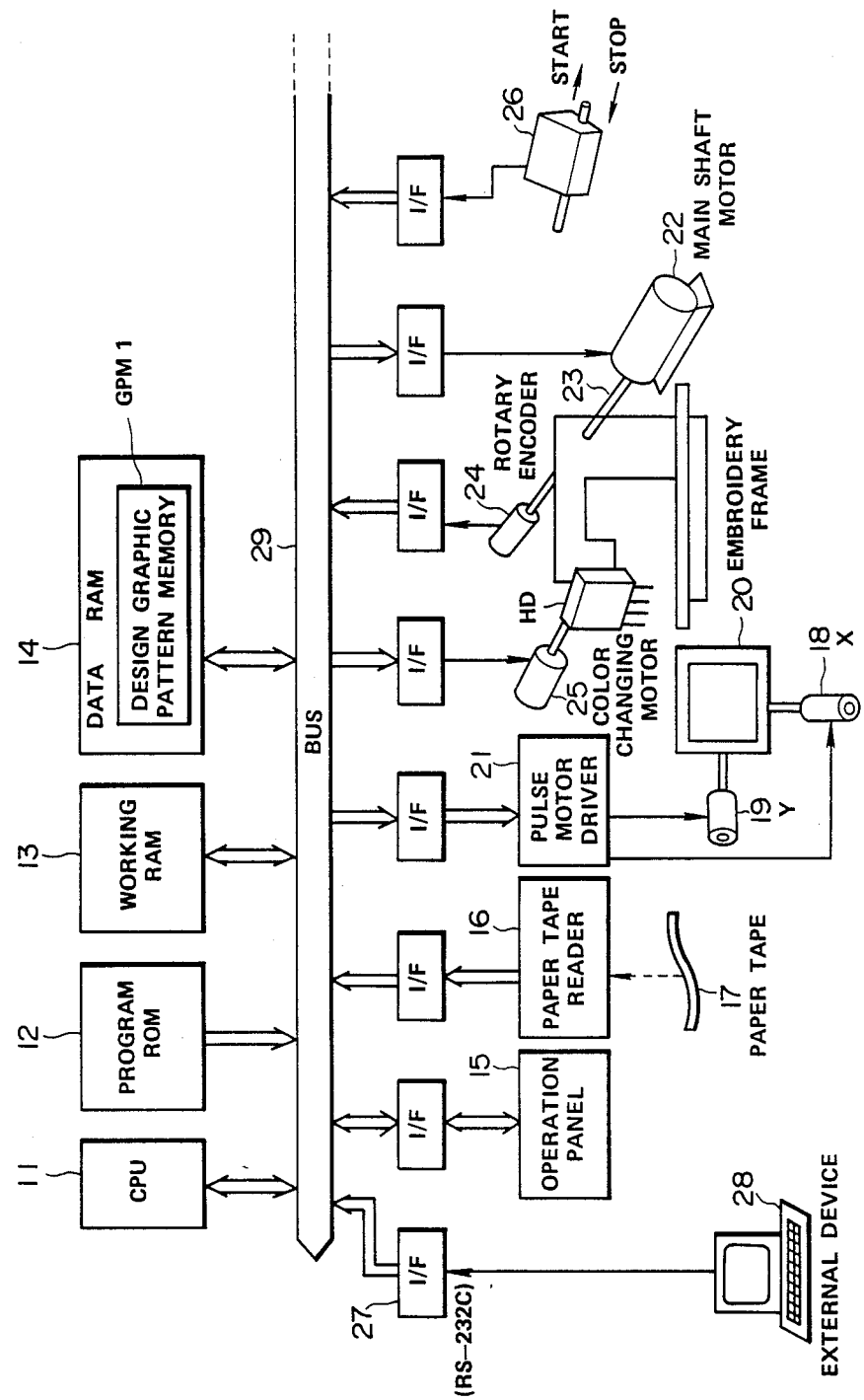
FIG. 2 is a block diagram showing a hardware structure which schematically shows a control system of an embodiment of the automatic embroidering machine according to the invention.

FIG. 2 is a diagram showing a hardware structure of an embodiment of the control system for an automatic embroidering machine according to the invention. The operation of the entire automatic embroidering machine is controlled by a microcomputer including a CPU 11, a program ROM 12 and a working RAM 13. A data RAM 14 stores various data including stitch data for realizing a desired embroidery design and other data relating to embroidery stitching. A design graphic pattern memory GPM1 storing graphic pattern data of the embroidery design is also included in this data RAM 14.

An operation panel 15 includes various setting switches and displays. A paper tape reader 16 reads out stitch data recorded on a paper tape (data directly relating to the embroidery operation such as X, Y data designating position of an embroidery frame for each stitch and function data designating operations of the embroidering machine including color changing, stopping of the main shaft of the machine and jump). A paper tape 17 on which stitch data for realizing a desired embroidery design is recorded is set in this paper tape reader 16. The stitch data read from this paper tape 17 through the paper tape reader 16 is transmitted to the data RAM 14 and stored therein.

An X-axis pulse motor 18 moves an embroidery frame 20 in the X-axis direction. A Y-axis pulse motor 19 moves the embroidery frame 20 in the Y-axis direction. To these pulse motors 18 and 19 are applied drive signals through a pulse motor driver 21.

A main shaft motor 22 drives a main shaft 23 of this automatic embroidering machine to be rotated. As is well known, a needle and a hook of the embroidering machine are driven in accordance with the rotation of the main shaft 23. A rotary encoder 24 detects the angle of rotation of the main shaft 23 (or motor 22).

Assuming that one stitching head HD is a multineedle stitching head, this head HD comprises a plurality of needles (each needle being attached with thread of a different color). A color changing motor 25 causes, by its rotation, one of the plural needles of the head HD to be selected and driven by a needle drive mechanism in the head HD. The needle drive mechanism is adapted to move the needle vertically as the main shaft 23 is rotated. Since this needle drive mechanism is known, illustration thereof is omitted. The number of the stitching head HD is not limited to one but plural stitching heads may be provided in parallel.

A start/stop switch 26 consists of a bar switch which functions as a start switch when the bar is manipulated, e.g., in the rightward direction and functions as a stop switch when the bar is manipulated, e.g., in the leftward direction. When the start switch is ON, the rotation of the main switch 23 is started and when the stop switch is ON, the rotation of the main shaft 23 is stopped.

A communication interface 27 is an external input-output interface for effecting inputting and outputting of stitch data and control data between the embroidering machine and an external device 28. The communication interface 27 consists of, e.g., an RS-232 serial interface.

The external device 28 consists of, e.g., a personal computer having a communication function or terminal device of a suitable intelligent type and is capable of setting, editing and storing of stitch data and control data corresponding to the embroidery design. The external device 28 performs inputting and outputting of stitch data and control data with the embroidering machine through a communication line.

The automatic embroidering machine further comprises other devices and equipments whose illustration is omitted. The devices constituting the control system of the automatic embroidering machine deliver out and receive signals with the microcomputer through an interface I/F.

Figure 3:
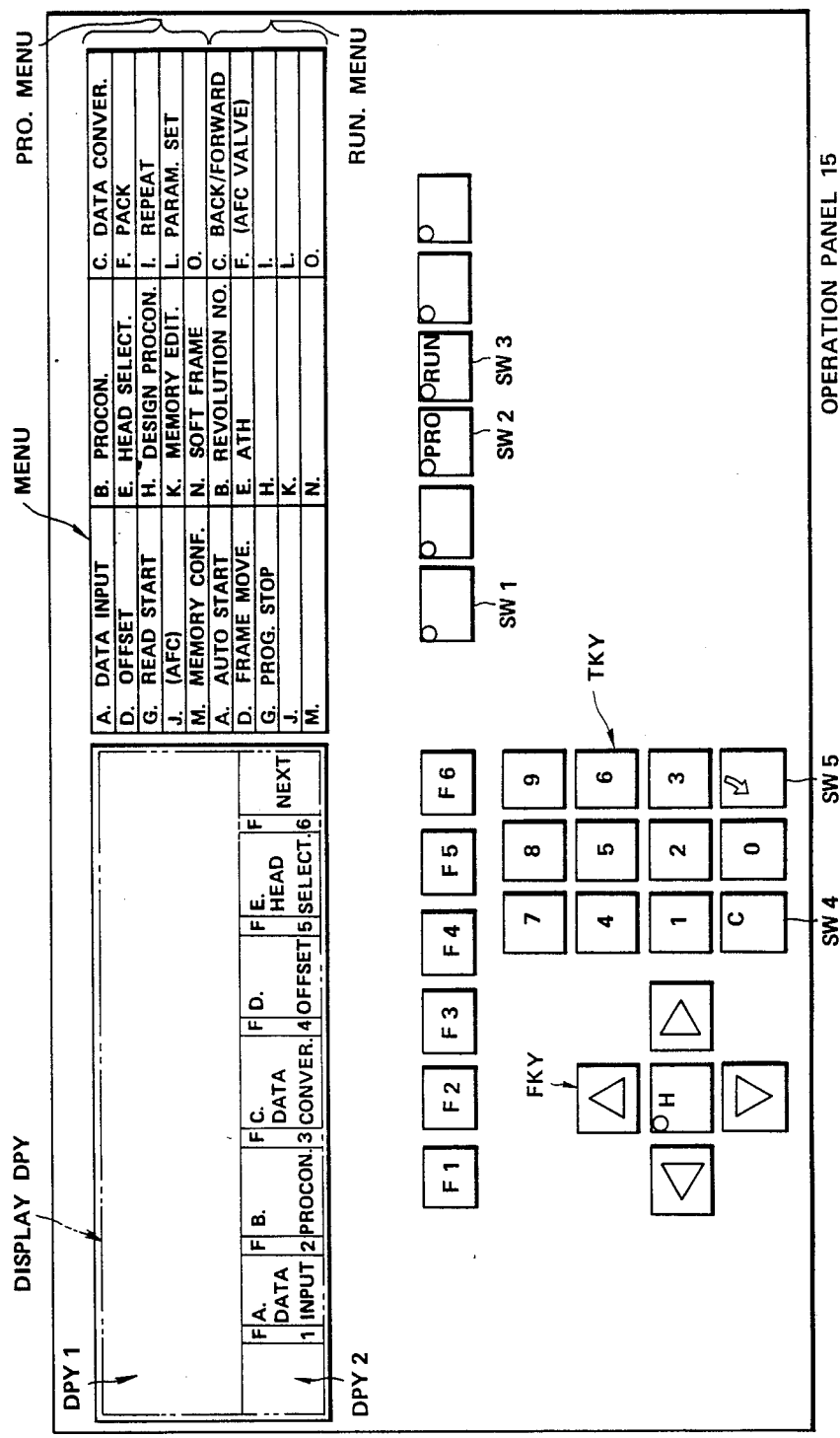
FIG. 3 is a plan view showing an example of the operation panel in FIG. 2.

An example of the switches and displays provided in the operation panel 15 is shown in FIG. 3.

A display DPY is provided for displaying data which is being set during setting of various data, displaying data which has already been set for confirmation thereof and displaying other necessary information. The display DPY is capable of displaying letters and also figures if necessary. The display DPY can be used in several display modes and, as one of such display modes, there is a display mode for setting various data or confirming contents of the set data. In this mode, as shown in FIG. 3, the display DPY functions in two sections of a set contents display section DPY1 occupying a relatively large area in the upper stage of the display DPY and a function switch explanation display section DPY2 in the lower stage. In another display mode, the display DPY functions as display means for displaying a graphic pattern of the embroidery pattern. A quarts display may, for example, be employed as this display DPY.

Six function switches F1–F6 are provided below the display DPY. The above described function switch explanation display section DPY2 displays explanation about the function assigned to the respective function switches F1–F6.

Depending upon the state of assignment of the functions to the function switches F1–F6, the left side five function switches F1–F5 sometimes function as function switches corresponding to various data setting functions and the remaining switch F6 functions as a next function (NEXT) selection key. The function switch explanation display section DPY2 consists of six frames corresponding to the function switches F1–F6 and in each of the display frames corresponding to the function switches F1–F6 appears a display explaining the function which is currently assigned to the function switch (e.g., this display consists of letters "DATA INPUT" or "PROCON"). In this case, if the function switch F6 is functioning as the next function selection key, a display "NEXT" explaining the next function selection key function appears.

A function switch menu section MENU disposed on the right side of the display DPY is a list in which displays of all functions assignable to the function switches F1–F6 are visibly and fixedly displayed. This function menu section MENU consists of a program mode menu PRO.MENU and running mode menu RUN.MENU. The program mode menu PRO.MENU displays all functions assignable to the function switches F1–F6 during the program mode. The running mode menu RUN.MENU displays all functions assignable to the function switches F1–F6 during the running mode.

The program mode is a mode in which setting of various data relating to the embroidery program for realizing a desired embroidery design (e.g., inputting of data corresponding to the desired embroidery design, i.e., "DATA INPUT" or setting of the order of changing thread color, i.e., "PROCON") is performed. The running mode is a mode in which setting of running conditions (e.g., the revolution number of the main shaft of the machine) before start of operation of the embroidering machine.

A display changeover switch SW1 is provided for switching the display mode of the display DPY. This display changeover switch SW1 is used, for example, when, as illustrated, the display mode is switched from the display mode in which the display DPY is used in the two sections of the setting contents display section DPY1 and the function switch explanation display section DPY2 to another display mode.

A program mode switch SW2 is a switch operated when the operation mode of this embroidering machine is set to the above described program mode.

A running mode switch SW3 is a switch operated when the operation mode of this embroidering machine is set to the above described running mode.

A frame moving key switch FKY is a switch operated when the embroidery frame 20 is moved by a manual operation. A ten key switch TKY is a switch operated when various numerical data are to be inputted. A setting confirmation switch SW4 is a switch operated when contents of set data are to be confirmed in various data setting operations. A set switch SW5 is a switch operated when numerical data inputted by the ten key switch TKY is to be registered or upon completion of setting of a function and functioning as a return key.

A specific example of a graphic pattern display of an embroidery design will now be described.

In the graphic display mode, the display DPY displays the graphic pattern of the embroidery design in a dot pattern. More specifically, in graphic pattern data stored in the design graphic pattern memory 14 in the data RAM 14, one bit corresponds to one dot.

Figure 4A:
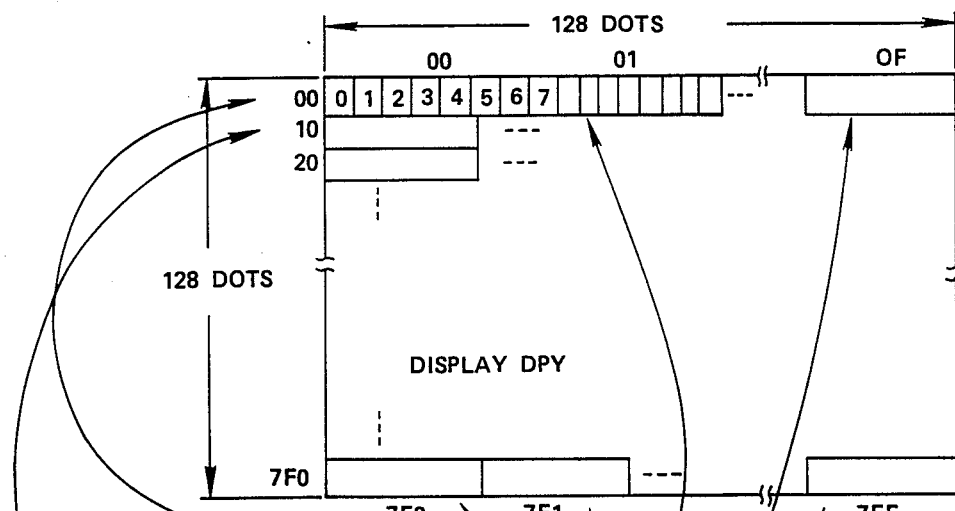
FIGS. 4a and 4b are diagrams showing examples of display dot construction of a display device and memory positions of a graphic pattern memory corresponding to the respective dot positions.
Figure 4B:
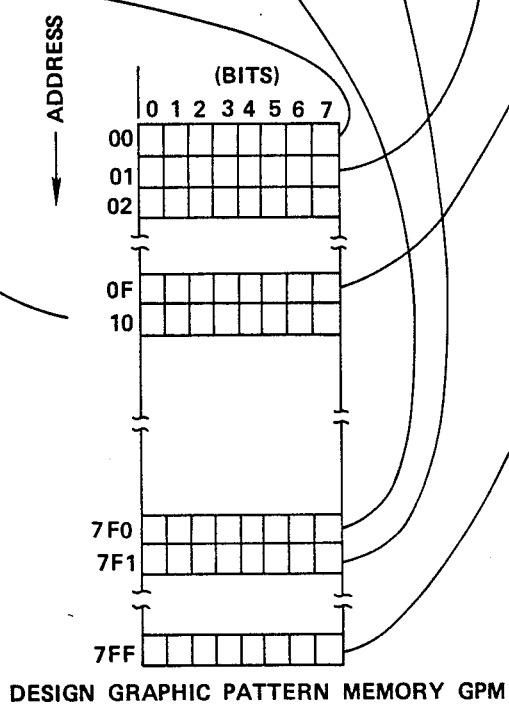

By way of example, the display DPY consists of $128 \times 128$ dots as shown in FIG. 4(a), constituted by dot data of 2048 bytes. The design graphic pattern memory GPM1 has, as shown in FIG. 4(b), memory capacity of 2048 bytes corresponding to the number of dots of the display DPY. For example, 16 addresses of 00(H)–0F(H) ($16 \times 8 = 128$ bits) correspond to 128 dots of the uppermost stage of the display DPY and 1920 addresses of 10(H)–7FF(H) correspond to the remaining dots of the display DPY. (H) represents the data expressed in modulo 16.

For preparing a graphic pattern data of an embroidery design realized by stitch data for realizing a desired embroidery design on the basis of such data, the following steps, for example, are executed. The stitch data consists of X and Y data for each one stitch and function data. The X and Y data represent relative amount of displacement for each stitch and not absolute coordinates for each stitch. For graphic displaying the embroidery design, it is necessary to obtain absolute coordinates for each stitch. For this purpose, by accumulating X and Y data from the starting point of the embroidery to any desired i-th stitch respectively in the following manner, absolute coordinates $XA_i$, $YA_i$ at the desired i-th stitch are obtained (see FIG. 5). In this case, the origin of the coordinates is the starting point of the embroidery.

$$XAi = X1 + X2 + X3 + \ldots + Xi$$

$$YAi = Y1 + Y2 + Y3 + \ldots + Yi \quad (1)$$

Next, the absolute coordinates $XA_i$, $YA_i$ in the embroidery frame are converted to the absolute coordinates $Xa_i$, $Ya_i$ on the display DPY. Since the magnitude of the display DPY is sufficiently smaller than the magnitude of the embroidery frame 20, a graphic obtained by scaling down the actual magnitude of the embroidery frame at a suitable scaling ratio is displayed by the display DPY. In this case, the scaling down ratio, i.e., conversion ratio, K should preferably be selected at a suitable value. Examples of preferred conversion ratio K are ½, ⅓, 1/5 and 1/10. The converted formula is, for example, as follows:

$$Xai = INT(K \times XAi + 0.5) + Xs$$

$$Yai = INT(K \times YAi + 0.5) + Ys \quad (2)$$

INT ( ) represents conversion of the numerical value in the parenthesis to integer. In the formula, 0.5 is added for rounding the products $K \times XAi$ and $K \times YAi$ to the nearest whole number, respectively. Xs and Ys represent X and Y coordinates at the starting point of the graphic display on the display. These starting point coordinates Xs and Ys can be selected as desired. For example, the dot coordinates at the center of the display DPY are 63, 63 and, if the starting point of the graphic display is selected at the center of the display DPY, Xs, Ys become 63, 63.

The coordinates $Xa_i$, $Ya_i$ represent a needle position so that graphic coordinates on the stitch line connecting the preceding needle position $Xa_{i-1}$, $Ya_{i-1}$ and the current needle position $Xa_i$, $Ya_i$ must be further obtained. For this purpose, difference $\Delta x = Xai - Xai - 1$, $\Delta y = Yai - Yai - 1$ between the preceding needle position $Xa_{i-1}$, $Ya_{i-1}$ and the current needle position $Xa_i$, $Ya_i$ are respectively calculated and the absolute values of $\Delta x$ and $\Delta y$ are compared with each other and the following processing (1) or (2) is executed in accordance with the result of the comparison:

Processing (1): when $|\Delta x > \Delta y|$

X coordinate position $X_k$ (k = 1, 2, 3 ... m, where m being the number of dots corresponding to the width of $\Delta x$) obtained by dividing the width of $\Delta x$ by one dot unit is used as the X coordinate position of the stitch line. The X coordinate position at k = 1, i.e., $X_k = X_1$, is $Xa_{i-1}$. The X coordinate position at k = m, i.e., $X_k = X_m$, is $Xa_i$.

The Y coordinate position Yk on the stitch line can be obtained by $$Yk = INT[(\Delta y/\Delta x)(Xk - Xai - 1) + Yai - 1 + 0.5] \quad (3)$$

In the same manner as described above, INT[ ] represents that the numerical value in [ ] is converted to integer. The addition of 0.5 is made for rounding the numerical value in [ ] to the nearest whole number.

Processing (2): when $|\Delta x < \Delta y|$

The Y coordinate position Yk ($k = 1, 2, 3 \ldots m$, where m represents the number of dots corresponding to the width of $\Delta y$) obtained by dividing the width of $\Delta y$ from Yai$-1$ to Yai is used as the Y coordinate on the stitch line. The Y coordinate at $k = m$, i.e., $Yk = Ym$, is Yai.

The X coordinate Xk on the stitch line can be calculated by $$Xk = INT[(\Delta x/\Delta y)(Yk - Yai - 1) + Xai - 1 + 0.5] \quad (4)$$

FIG. 6(a) shows an example of the coordinates of a stitch on the embroidery frame. Assume that the absolute coordinates (Xai$-1$, Yai$-1$) at the needle position C are, for example, (500, 300). Assume also that the absolute coordinates (Xai, Yai) of a next needle position D (Xai, Yai) are (550, 260). If the respective absolute coordinates of the needle positions C and D are converted to coordinates on the display, they become (113, 93) and (118, 89) as shown in FIG. 6(b). In this example, the conversion ratio K was 1/10 and the starting point coordinates Xs, Ys were 63, 63. In this case, since $\Delta x = 5$, $\Delta y = -4$ so that $|\Delta x > \Delta y|$, the X coordinate on the stitch line on the display are 113, 114, 115, 116, 117 and 118 and the Y coordinate position on the switch line are 93, 92, 91, 90 and 89 from the formula (3). Accordingly, the X, Y coordinates on the stitch line from C' to D' are (113, 93), (114, 92), (115, 91), (116, 91), (117, 90) and (118, 89) as shown in FIG. 6(c).

The graphic coordinate data of the embroidery pattern calculated in the foregoing manner are stored in the graphic pattern memory GPM. The memory position in the graphic pattern memory GPM corresponding to a dot position on the display represented by graphic coordinates (x, y) generally is the D-th bit in the address of the graphic pattern memory GPM expressed by the equation $$(128 - y) \div 16 = A \text{ leaving } B$$

$$x \div 8 = C \text{ leaving } D \quad (5)$$

If, for example, the graphic coordinates are (113, 93), $$(128 - 93) \div 16 = 2 \text{ leaving } 3$$

$$113 \div 8 = 14 \text{ leaving } 1$$

so that the memory position at the first bit among 0-7 bits of the address 23E(H) in the graphic pattern memory GPM corresponds to the graphic coordinates. In this manner, "1" is stored in the memory position corresponding to the graphic coordinate position in the graphic pattern memory GPM, and "0" is stored in the other memory position of the memory GPM.

Next, operations concerning the present invention among the operations executed by the automatic embroidering machine of FIG. 2 under the control of the microcomputer will be described with reference to flow charts of FIG. 7 and subsequent figures.

Upon turning on of the automatic embroidering machine, as shown in FIG. 7, the processing proceeds to embroidering machine main shaft stop routine through a predetermined initial routine. Processing operations concerning the portion relating to the present invention and processing operations for setting various data are executed in this main shaft stop routine. When the machine is not running, this main shaft stop routine is always carried out. When the start switch has been turned ON by operating the start/stop switch 26, the processing proceeds to running routine. In the running routine, the main shaft 23 is driven and rotated and stitch data for each one stitch is sequentially read out from the stitch data memory area in the data RAM 14 in synchronism with one rotation of the main shaft and the stitching operation is carried out in accordance with the read out data.

An example of the main shaft stop routine will be described with reference to FIG. 8. In stop initial routine, a predetermined initializing processing during stop of the machine is executed. In next step 30, whether or not the operation mode is the running mode or the program mode is examined in accordance with the contents of an operation mode flag. The operation mode becomes the program mode by turning on of the program mode switch SW2 and the running mode by turning on of the running mode switch SW3.

If the operation mode is the program mode, the processing proceeds to step 31 in which setting of various data is executed. If confirmation of the embroidery design is desired, "memory confirmation mode" is selected in this program mode. The selection for this purpose is made by operating the function switches F1-F6 in the following manner.

In the program mode, the display DPY first becomes a state as shown in FIG. 3 and the function switch explanation display section DPY2 displays explanation of the modes A-E in the program mode. If a next function is selected by depressing the function switch F6, the function switch explanation display DPY2 displays explanation of the modes F-J in the program mode. If the function switch F6 is depressed once again for next function, the function switch explanation display section DPY2 displays, as shown in FIG. 10(a), explanation of the modes K-M in the program mode. If the function switch F3 is depressed in this state, "memory confirmation mode" is selected. The judgement "memory confirmation mode ?" in step 32 thereby becomes YES and the processing proceeds to memory confirmation processing routine 33.

An example of the memory confirmation processing routine is shown in FIG. 9. First, in step 34, the design number of the design on which confirmation display of the embroidery design is to be made is selectively inputted by the ten key switch TKY. In the data RAM 14, stitch data of plural types of embroidery designs are stored and design numbers are assigned to the stored embroidery designs. In step 34, this design number is selected. In this step 34, contents of display of the display DPY is switched as shown in FIG. 10(b). At a position at which the desired design number should be inputted, numerical value displayed at this position is intermittently lighted. If, for example, "2" is inputted, "02" is intermittently lighted indicating that "2" has been inputted. If the design number which is currently being intermittently lighted is correct, the setting confirmation switch SW4 is operated and the processing proceeds to a next step. At this time, the set design number data is registered in a register in the data RAM 14.

In next step 35, the contents of display of the display DPY are switched as shown in FIG. 10(c). At a position at which X-axis coordinate data at a desired display starting point should be inputted, numerical value at this position is intermittently lighted. If, for example, X-axis coordinate data has not been inputted yet, "63" indicating the center is intermittently lighted. Upon inputting of desired X-axis coordinate data by operation of the ten key switch TKY, the inputted numerical value is intermittently lighted. If the X-axis coordinate data which is currently being intermittently lighted is correct, the setting confirmation switch SW4 is operated and then setting of the Y-axis coordinate data is performed. In this case, contents of display of the display DPY are switched as shown in FIG. 10(d). In the same manner as described above, if, for example, the Y-axis coordinate data has not been inputted yet, "63" indicating the center is intermittently lighted. Upon inputting of desired Y-axis coordinate data by operation of the ten key switch TKY, the inputted numerical value is intermittently lighted. If the Y-axis coordinate data which is currently being intermittently lighted is correct, the setting confirmation switch SW4 is operated and the processing proceeds to next step. The set X, Y-coordinate data Xs, Ys at the display starting point are registered in a register in the data RAM 14.

In next step 36, the conversion ratio K is set and inputted by operation of the ten key TKY. In this step 36, contents of display of the display DPY are switched as shown in FIG. 10(e). At a position at which a desired conversion ratio should be inputted, numerical value at this position is intermittently lighted. If the conversion ratio has not been inputted yet, a predetermined standard ratio (e.g., "1/10") is intermittently lighted. If a desired conversion ratio is inputted by operation of the ten key switch TKY, the inputted numerical value is intermittently lighted. If the conversion ratio which is currently being intermittently lighted is correct, the setting confirmation switch SW4 is operated and the processing proceeds to next step. The set conversion ratio data is registered in a register in the data RAM 14.

In step 37, the contents of the design graphic pattern memory GPM is cleared and the contents of the display DPY also are cleared to change the display DPY to the graphic display mode.

In next step 38, the stitch counter is reset to initial value "1" to set a state in which stitch data of the embroidery design corresponding to the design number set in the preceding step is started to be read out of the stitch data memory area in the data RAM 14.

In next step 39, stitch data for one stitch, (X, Y data and function data) in the stitch data of the specific embroidery design which has been set to readout start state as described above is read out from the data RAM 14.

In next step 40, absolute coordinates (XAi, YAi) of the current stitch are calculated by the operation of the above described equation (1). That is, X data of the current stitch read out in step 39 is added to the X coordinate value of the absolute coordinates of the preceding stitch for obtaining X coordinate value XAi of the absolute coordinates of the current stitch. Again, Y data of the current stitch read out in step 39 is added to the Y coordinate value of the absolute coordinates of the preceding stitch for obtaining Y coordinate value of the absolute coordinates of the current stitch.

In next step 41, absolute coordinates (Xai, Yai) on the display of the current stitch are obtained by the operation of the equation (2). That is, the operation of the equation (2) is performed by using the absolute coordinates (XAi, YAi) on the embroidery frame obtained by the preceding step 40, X, Y coordinate data Xs, Ys at the display starting point set in steps 35 and 36 and the conversion ratio K. The coordinate data (Xai, Yai) obtained in this step are used in next step 42 and also are stored in a register for utilization in step 42 concerning next stitch.

In step 42, graphic coordinates (dot coordinates) data Xk, Yk of the stitch line connecting adjacent needle positions are obtained in accordance with the above described processing (1) or (2). More specifically, differences $\Delta x$, $\Delta y$ are obtained from the display coordinate data (Xai−1, Yai−1) concerning the preceding stitch stored in the register and the display coordinate data (Xai, Yai) concerning the current stitch and the above described processing (1) or (2) is executed in accordance with the magnitude of the differences to obtain graphic coordinate data Xk, Yk corresponding to one stitch line (where k=1, 2, 3, ... m and m being the number of dots corresponding to the width of the larger absolute value of $\Delta x$ and $\Delta y$). The graphic coordinate data Xk, Yk thus obtained are stored in the form of a dot pattern in the design graphic pattern memory GPM1.

In next step 43, the graphic coordinate data in the dot pattern form stored in the design graphic pattern memory GPM1 is read out and a pattern in the dot pattern form corresponding to the read out coordinate data, i.e., the pattern of the embroidery design, is displayed in the display DPY.

In next step 44, whether or not contents of the function data in the stitch data for one stitch read out in the preceding stitch 39 are an end code representing the end of the embroidery design is examined. If the contents of the function data are not the end code, the processing returns to step 39 through step 45 and processings of steps 39-44 as described above are repeated in connection with next stitch designated by the stitch counter. In step 45, contents of the stitch counter are stepped to designate next stitch. Upon completion of the processings of steps 39-44 concerning stitch data of all stitches, the function data becomes the end code and the processing returns to the main routine. At this time, the graphic pattern data of the entire embroidery design has already been stored in the design graphic pattern memory GPM1 so that the pattern of the entire embroidery design is displayed on the display DPY. Therefore, the embroidery design can be confirmed.

Reverting to FIG. 8, in step 46, whether or not the running mode switch SW3 is ON is examined. If result is NO, the processing returns to step 31 in which the processing of the program mode is repeated.

Upon turning on of the running mode switch SW3, the operation mode is switched from the program mode to the running mode. Immediately after switching to the running mode, initializing of various data is executed for starting the embroidering operations (step 47).

In step 48, setting of various data in the running mode is executed. In the running mode, the function switch explanation display section DPY2 displays the modes A-E in the running mode (see the running mode menu RUN. MENU in FIG. 3). If a next function is selected by depressing the function switch F6, the function switch explanation display section DPY2 displays explanation of F and G modes in the running mode. The function switch explanation section DPY2 is set to a state in which a desired mode can be displayed and the desired mode is selected by operating one of the function switches F1–F5. Desired data is set by operating the ten keys TKY or the like means. If, for example, the revolution number of the embroidering machine is to be set, "revolution number mode" of the mode B is selected and a desired revolution number is set and inputted by the ten key switch TKY. In this manner, necessary conditions for running the embroidering machine are established in step 48.

In step 49, whether or not the start switch has been turned ON by the start/stop switch 36 is examined. If the start switch is ON, the processing returns to the main routine and enters the running routine (FIG. 7). If the start switch is not ON, the processing proceeds to step 50 in which whether or not the program mode switch SW2 is ON is examined. If the result is NO, the processing returns to step 48 in which routine for setting various data in the running mode is repeated. If the program mode switch SW2 is ON, the operation mode is switched from the running mode to the program mode and the processing proceeds to step 31 in which the routine for setting various data in the program mode is repeated.

In the above described embodiment, in the memory confirmation processing routine of FIG. 9, design graphic pattern data for each stitch is prepared and, simultaneously, graphic display corresponding to the prepared graphic pattern is performed. Alternatively, design graphic pattern data which has already been prepared (already stored) may be read from the design graphic pattern memory GPM1 and the read out data may be displayed. In this case, graphic pattern data for plural types of embroidery designs may be stored in the design graphic pattern memory GPM1 and one of them may be read out and displayed.

The processing program for preparing design graphic pattern data for each stitch may be omitted and, instead, memory means prestoring graphic pattern data corresponding to the embroidery pattern may be provided and graphic pattern data of a desired embroidery design may be read from this memory means and displayed. The memory means in this case is not limited to RAM but it may be a ROM or an external memory such as paper tape and a magnetic disc.

As display means for displaying the graphic pattern of the embroidery design, the present invention is not limited to quartz display but electric or electronic devices such as a CRT display, LED display and plasma display and hard copy devices such as a printer may be employed.

In the above described embodiment, the embroidery design display device according to the invention is incorporated in the automatic embroidering machine. The embroidery design display device may, however, be attached to a separate automatic embroidering machine as a separate unit.

Description will now be made about an embodiment of a processing for judging whether or not a desired embroidering design is within the embroidery frame before the running for embroidering of the embroidery design is started (hereinafter referred to as "soft frame limit processing"). This "soft frame limit processing" is performed by displaying both the embroidery design and the embroidery frame shape.

In this embodiment, in the harware structure of FIG. 2, a frame graphic pattern memory GPM2 as shown in FIG. 11 storing graphic pattern data of the embroidery frame shape is added. This graphic pattern memory GPM2 consists, for example, of a RAM. The address input and the data input and output of this memory GPM2 are connected to the CPU (FIG. 2).

In this embodiment, "frame data" which expresses the shape or shapes of one or more embroidery frames in the stitch data form (a data form in which the shape of the embroidery frame is converted to stitch design consisting of a suitable stitch width and expressed by displacement data in X and Y directions for each stitch) is stored in the data RAM 14. This "frame data" may be read, as in a normal embroidery stitch data, from the paper tape 17 and stored in the data RAM 14. In this embodiment, graphic pattern data of the embroidery frame shape to be stored in the frame graphic pattern memory GPM2 is prepared in accordance with the "frame data" stored in the data RAM 14.

Description will now be made about a specific example of graphic pattern representation of an embroidery design or embroidery frame shape.

During the graphic display mode, the display DPY displays the embroidery design or embroidery frame shape with a dot pattern. More specifically, in graphic pattern data stored in the design graphic pattern memory GPM1 and frame graphic pattern memory GPM2, one bit corresponds to one dot.

As to the graphic display of the embroidery design, description has been made with reference to FIGS. 4–6. As described above, the design graphic pattern data is stored in the design graphic pattern memory GPM1.

The preparation of graphic pattern data of embroidery frame shape in accordance with "frame data" in which the shape of the embroidery frame is expressed in the stitch data form can be made in the same manner as described above. As described above, "frame data" consists of X, Y data for each one stitch obtained by converting the embroidery frame shape to stitch pattern and, if necessary, function data.

An example of the embroidery frame shape in the stitch data form expressed as "frame data" is shown in FIG. 12. FIG. 12(a) shows an example of an actual embroidery frame and FIG. 12(b) shows an example of state in which this embroidery frame has been converted to a stitch pattern. In FIG. 12(b), the x marks correspond to the needle positions and the line connecting them corresponds to stitch width. A desired needle position is selected as a reference point and stitch data for plural stitches beginning with this reference point, tracing the contour of the embroidery frame and ending with the reference point (i.e., X, Y data for each stitch) is prepared as "frame data" and this "frame data" is stored on the paper tape 17 or the like. With respect to one or more types of embroidery frames, the paper tape 17 storing such "frame data" of the stitch data form is prepared and "frame data" of a desired one or more embroidery frames are read from the corresponding paper tapes 17 and are respectively stored in the data RAM 14. For distinguishing one embroidery frame from another, a frame number is assigned to "frame data" corresponding to each embroidery frame so that "frame data" of a desired embroidery frame can be read from the data RAM 14 by designating this frame number. The frame graphic pattern data is prepared in accordance with the read out "frame data" and stored in the frame graphic pattern memory GPM2.

Such preparation (conversion) of frame graphic pattern data in accordance with "frame data" and storing of this data in the frame graphic pattern memory GPM2 are performed entirely in the same manner as in the case of preparation (conversion) of the above described design graphic pattern of the embroidery design and storing of this data in the design graphic pattern memory GPM1. More specifically, frame graphic pattern data in accordance with "frame data" is converted to the form of bit pattern data (dot pattern data) corresponding to the dot position on the display DPY and stored in the frame graphic pattern data memory GPM2. If "frame data" is simply converted to bit pattern data in the same manner as described above, the start position on the display DPY of the frame graphic pattern data consisting of bit pattern data (position corresponding to the above described Xs, Ys) corresponds directly to the reference point (see FIG. 12(b)). This position coincides with the start position on the display DPY of the design graphic pattern data, i.e., the embroidery starting position. This causes difficulty in comparing the design pattern with the frame pattern and besides the frame pattern display cannot be made within the limited display frame of the display DPY. Accordingly, an offset value corresponding to difference between the reference point in the actual embroidery frame 20 and the embroidery starting position is added to or subtracted from the frame graphic pattern data so as to match the relative positional relation between the design graphic pattern data and the frame graphic pattern data with the actual positional relation. Thus, the frame graphic pattern data modified with the offset value is stored in the frame graphic pattern memory GPM2.

In the foregoing manner, by reading out the design graphic pattern data and the frame graphic pattern data prepared from the respective pattern memories GPM1 and GPM2 and displaying the read out data together by the display DPY, whether or not the selected embroidery design can fit in the embroidery frame to be used can be judged. FIGS. 13(a) and 13(b) show an example of display in the display DPY in which FIG. 13(a) shows a state in which a design P fits in a FIG. F of the embroidery frame and FIG. 13(b) shows a state in which the design P does not fit in the FIG. F.

Alternatively, frame graphic pattern data which is not modified by the offset value may be stored in the frame graphic pattern memory GPM2 and the modification with the offset value may be effected when the read out data is displayed.

It is also possible to judge whether or not the design graphic pattern data and the frame graphic pattern data cross each other on the basis of comparison, in data form, of the two data prepared for displaying purpose without actually displaying the pattern of the embroidery design and the pattern of the embroidery frame by the display DPY whereby whether or not the selected embroidery design can fit in the embroidery frame to be used can be automatically judged.

This automatic judgement will now be described. The design graphic pattern data consisting of bit pattern data and the frame graphic pattern data modified with the offset value are compared bit by bit to obtain logical product for each bit. If there is even a single bit in which logical product is satisfied, the embroidery design crosses the embroidery frame at the position corresponding to this bit so that it is judged that the embroidery design does not fit in the embroidery frame. If there is no bit in which logical product is satisfied at all, it is judged that the embroidery design fits in the embroidery frame. The result of this judgement is displayed by the display DPY or other suitable display means. Judgement as to whether or not the embroidery design fits in the embroidery frame does not necessarily rely upon such comparison on the basis of logical product but may be performed by other method.

In the case of the automatic judgement also, if the frame graphic pattern data which is not modified with the offset value is stored in the frame graphic pattern memory GPM2, the relative positions of the design graphic pattern and the frame graphic pattern in comparing logical products of the two patterns may be matched with each other by reading out the frame graphic pattern data with reading address of the frame graphic pattern memory GPM2 being modified with the offset value.

As described in the foregoing, whether or not the embroidery design fits in the embroidery frame is confirmed before starting of the actual embroidering operation.

When the embroidering operation is started, the embroidery frame 20 is positioned so that the relative position thereof to the needle position of the head comes to a predetermined embroidery design start position. This positioning may be made manually as in the conventional device or, alternatively, may be made automatically in accordance with the offset value between the embroidery design start point and the reference point of the embroidery frame 20 in the above described graphic display. Since this offset value is a coordinate scale on the display DPY, this value is converted to actual coordinate scale and the embroidery frame is driven by this amount. Assuming that the amount of coordinate of the offset value on the display DPY is (Xo, Yo) and the above described conversion ratio is K, the actual coordinate amount (Ox, Oy) of the offset value is given by $$Ox = Xo/K, \ Oy = Yo/K \qquad (6)$$

Therefore, the embroidery frame 20 is first moved manually so that its reference point corresponds to the needle position of the head. Then, by automatically driving the embroidery frame 20 by the offset coordinate amount (Ox, Oy), the embroidery frame 20 can be positioned so that the relative position of the embroidery frame 20 to the needle position of the head comes to the predetermined embroidery design start position. For indicating the position of the reference point in the embroidery frame 20, a mark may preferably be affixed to the position of the reference point in the actual embroidery frame 20.

Next, operation of a portion relating to the present invention among operations executed by the automatic embroidering machine of FIG. 11 under the control of the microcomputer will be described with reference to the flow charts of FIG. 14 and subsequent figures.

Figure 14:
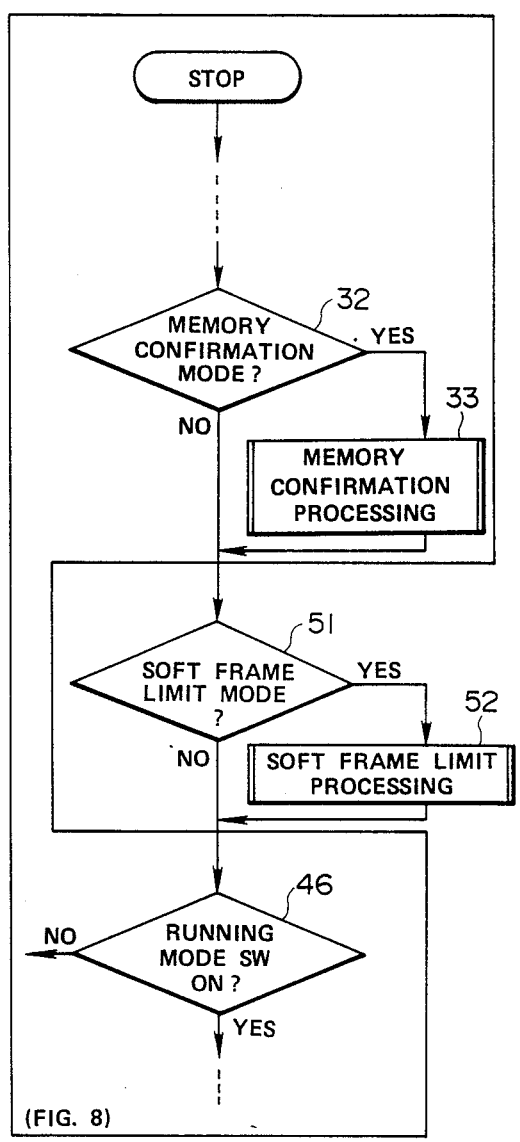
FIG. 14 is a flow chart showing an example of embroidering machine main shaft stop routine in the main routine in the program executed by a microcomputer in FIG. 11.

FIG. 14 shows a modified example of the stop routine of FIG. 8. In this modified example, steps 51 and 52 are inserted between steps 32, 33 and step 46 of FIG. 8. The unillustrated other steps are the same as the routine of FIG. 8.

In embroidering machine main shaft stop routine, if the operation mode is the program mode, the processing proceeds to step 31 (FIG. 8) in which setting of various data in the program mode is performed. For confirming whether or not the embroidery design to be embroidered fits in the embroidery frame, "soft frame limited mode" is selected in this program mode. The selection for this purpose is effected by operation of the function switches F1–F6.

In the program mode, the picture of the display DPY first is shown in FIG. 3 in which the function switch explanation display section DPY2 displays explanation of the modes A–E in the program mode. Upon selection of a next function by depression of the function switch F6, the function switch explanation display section DPY2 displays explanation of the modes F–J in the program mode. Upon selection of a next function by further depression of the function switch F6, the function switch explanation display section DPY2 displays, as shown in FIG. 16(a), explanation of the modes K–N in the program mode. If the function switch F4 is depressed in this state, "soft frame limit mode" is selected. Judgement in step 51 in FIG. 14 "soft frame limit mode?" thereby becomes YES and the processing proceeds to soft frame limit processing routine 52.

Figure 15A:
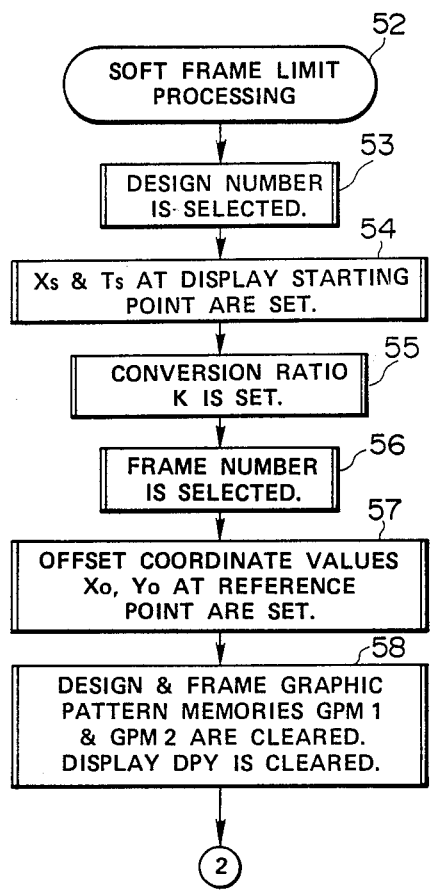
FIGS. 15a and 15b are flow charts showing an example of soft frame limit processing routine in FIG. 14.
Figure 15B:
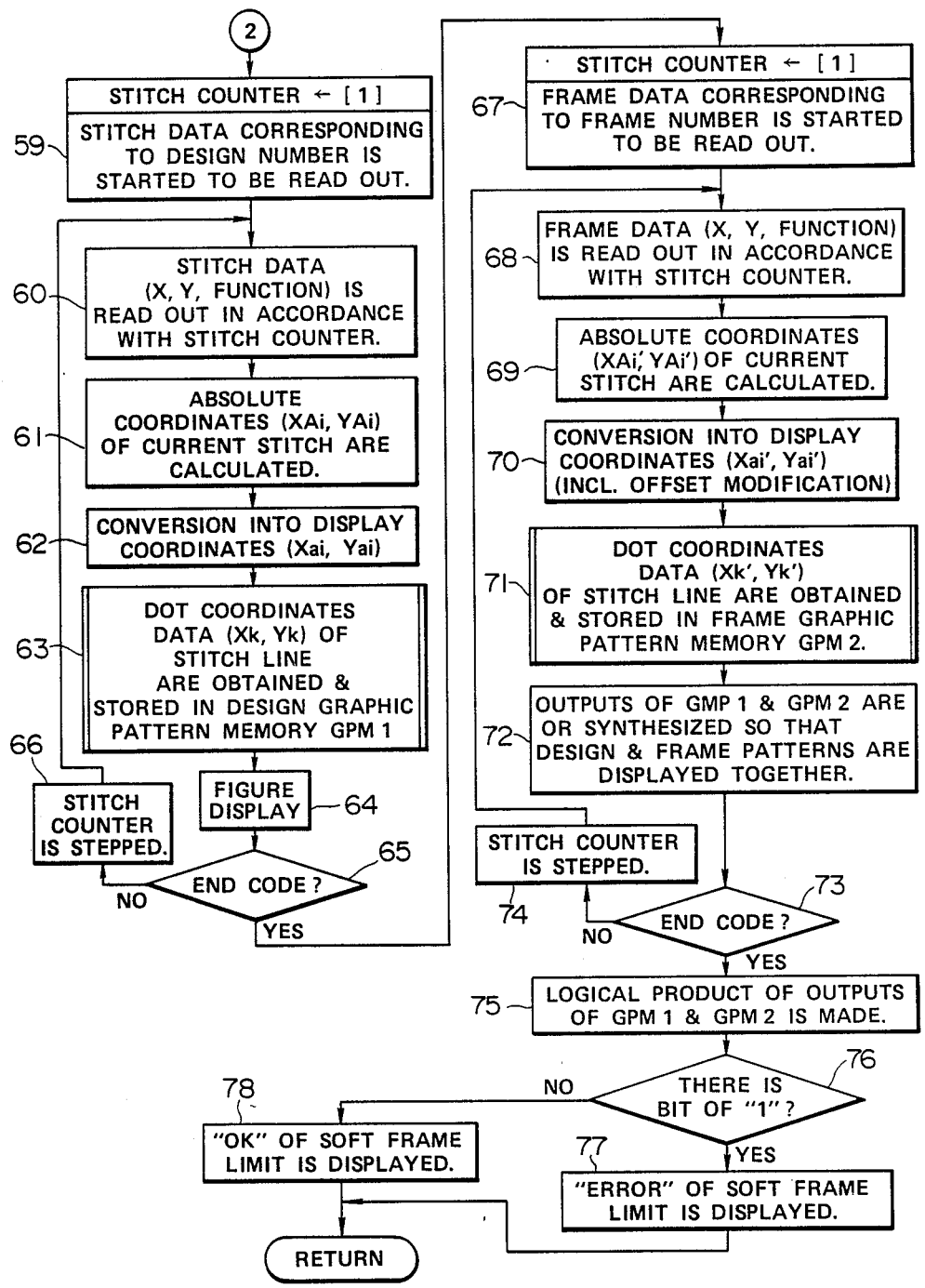

An example of soft frame limit processing routine is shown in FIGS. 15(a) and 15(b). First, in step 53, the design number of an embroidery design which is to be embroidered (in other words, an embroidery design on which confirmation as to whether or not the design fits in the embroidery frame is to be made) is selected and inputted by the ten key switch TKY. The data RAM 14 stores stitch data of plural types of embroidery designs and a design number is assigned to each stored embroidery design. In step 53, this design number is selected. In this step 53, display of the display DPY is switched as shown in FIG. 16(b). At a position at which a desired design number is to be inputted, the numberical value at this position is intermittently lighted. If, for example, the design number has not been inputted yet, "00" is intermittently lighted. Upon inputting of the desired design number by operation of the ten key switch TKY, the numerical value inputted is intermittently lighted. If, for example, "2" is inputted, "02" is intermittently lighted thereby indicating that "2" has been inputted as the design number. If the design number which is currently being intermittently lighted is correct, the setting confirmation switch SW4 is operated and the processing proceeds to next step. At this time, the set design number data is registered in a register in the data RAM 14.

In next step 54, the coordinates Xs, Ys at the display starting point are set and inputted by operation of the ten key switch TKY. In this step 54, display of the display DPY is switched as shown in FIG. 16(c). At a position at which the X-axis coordinate data at the desired display starting point is to be inputted, the numerical value at this position is intermittenly lighted. If, for example, the X-axis coordinate data has not been inputted yet, "63" representing the center is intermittently lighted. Upon inputting of the desired Y-axis coordinate data by operation of the ten key switch TKY, the inputted numerical data is intermittently lighted. If the Y-axis coordinate data which is currently being intermittently lighted is correct, the setting confirmation switch SW4 is operated and the processing proceeds to next step. The X, Y coordinate data Xs, Ys at the set display starting point are registered in the register in the data RAM 14.

In next step 55, the conversion ratio K is set and inputted by the ten key switch TKY. In this step 36, the contents of the display DPY are changed as shown in FIG. 16(e). At a position at which a desired conversion ratio should be inputted, the numerical value at the position is intermittently lighted. If the conversion ratio has not been inputted yet, a predetermined reference ratio (e.g., "1/10") is intermittently lighted. Upon inputting of the desired conversion ratio by the ten key switch TKY, the inputted numerical value is intermittently lighted. If the conversion ratio which is being currently lighted intermittently is correct, the setting confirmation switch SW4 is operated and the processing proceeds to a next step. The set conversion ratio K is registered in the register in the data RAM 14.

In next step 56, the frame number of the embroidery frame 20 set in the embroidering machine (i.e., an embroidery frame about which confirmation as to whether or not the embroidery design fits should be made) is selectively inputted by operation of the ten key switch TKY. In the data RAM 14, "frame data" of plural types of embroidery designs are stored and respectively assigned with frame numbers. In step 56, this frame number is selected. In this step 56, the selection of the frame number can be made in a manner similar to the above described selection operation for the design number. The selected frame number data is registered in the register in the data RAM 14.

In next step 57, offset coordinate values Xo, Yo at the reference point in the graphic display of the embroidery frame (see FIG. 12(b)) are set and inputted. These offset values Xo, Yo are, as described above, offset coordinate values at the reference point of the graphic display of the embroidery frame relative to the coordinates Xs, Ys at the display starting point of the embroidery design. The setting and inputting operations of the offset coordinate values Xo, Yo in this step 57 can be made in a manner similar to the setting and inputting operations of the coordinate data Xs, Ys at the starting point in the above described step 54. The set and inputted offset coordinate value data Xo, Yo are registered in the register in the data RAM 14.

In next step 58, the design graphic pattern memory GPM1 and the frame graphic pattern memory GPM2 are cleared and the contents of display of the display DPY are also cleared changing the display DPY to the graphic display mode.

Processings in next steps 59–65 and 66 are ones for displaying the figure of the embroidery design by the display DPY which are entirely the same as those in the above described steps 38–44 and 45. Preparation and display of graphic pattern data of an embroidery design are executed in the above described manner.

Upon completion of the processings of steps 60–65 concerning stitch data of all stitches, the function data becomes an end code and the processing proceeds to next step 67. At this time, graphic pattern data of the entire embroidery design is stored in the design graphic pattern memory GPM1 and the display DPY displays the pattern of the entire embroidery design.

The processings of steps 67–74 are processings for displaying the pattern of the embroidery frame by the display DPY and these processings are of the same contents of processing as in the above described steps 59–66.

More specifically, in step 67, the stitch counter is reset to the initial value "1" and brings about a state in which reading of "frame data" of the embroidery frame corresponding to the frame number set and inputted in the above step 56 is started.

In next step 68, frame data (X, Y data and function data) for one stitch designated by the stitch counter among the "frame data" of the specific embroidery frame reading of which has been started as described above is read from the data RAM 14.

In next step 69, absolute coordinates (XAi', YAi') of the current stitch are obtained by an operation of a formula similar to the above formula (1).

In next step 70, absolute coordinates (Xai', Yai') of the current stitch on the display are obtained as in the above described step 62 by an operation of a formula similar to the formula (2). In this step, offset modification operation corresponding to the offset coordinate values Xo, Yo may be performed. More specifically, an operation of a formula similar to the formula (2) is performed using absolute coordinates (XAi', YAi') on the embroidery frame obtained in the preceding step 69, coordinate data Xs, Ys at the display starting point set in steps 54 and 55 and the conversion ratio K, the offset coordinate values Xo, Yo set in the above described step 57 are added to or subtracted from the result of this operation whereby absolute coordinates (Xai', Yai') on the display which have been modified with the offset values concerning the current stitch are obtained. The coordinate data (Xai', Yai') obtained in this step are used in next step 71 and are also stored in the register for use in a processing in step 71 concerning next stitch.

In step 71, graphic coordinate (dot coordinate) data Xk', Yk' of stitch line connecting adjacent needle points are obtained in accordance with processings similar to the above described processings (1) or (2). The graphic coordinate data Xk', Yk' are stored in the form of dot pattern in the frame graphic pattern memory GPM2.

In next step 72, graphic coordinate data in the dot pattern form stored in the frame graphic pattern memory GPM2 are read out and the pattern of the dot pattern form corresponding thereto, i.e., the pattern of the embroidery frame, is displayed by the display DPY. The design graphic pattern data which has already been read from the design graphic pattern memory GPM1 and the frame graphic pattern which has just been read from the frame graphic pattern memory GPM2 are OR-synthesized for the same bit (dot) and OR synthesized output for each bit (dot) is applied to the display DPY so that the design pattern and the frame pattern are displayed together by the display DPY.

In next step 73, whether or not the contents of the function data among "frame data" for one stitch read out in the above described step 68 are the end code representing the completion is checked. If the contents are not the end code, the processing proceeds to step 68 through step 74 and steps 68–73 similar to the processing described above with respect to next stitch designated by the stitch counter are repeated. In step 74, the contents of the stitch counter are stepped and next stitch is designated. Upon completion of the processings of steps 68–73, the function data becomes the end code and the processing proceeds to next step 75.

At this time, graphic pattern data of the entire embroidery frame is stored in the frame graphic pattern memory GPM2 and the display DPY displays the pattern of the entire embroidery frame as well as the pattern of the entire embroidery design. Thus, by visually confirming the pattern of the embroidery design and the pattern of the embroidery frame displayed by the display DPY, whether or not the embroidery design can fit in the embroidery frame can be confirmed.

Processings in next steps 75–78 are carried out for automatically judging whether or not the embroidery design fits in the embroidery frame.

In step 75, design graphic pattern data and frame graphic pattern data are respectively read from the design graphic pattern memory GPM1 and the frame graphic pattern memory GPM2 and a logical product operation between the read out design graphic pattern data and the frame graphic pattern data is made for each same bit (dot).

In step 76, whether or not there is even a single bit (dot) of output "1", i.e., in which logical product has been satisfied, in the result of the logical product operation is examined.

As described previously, if there is even one bit (dot) in which logical product has been satisfied, this means that the embroidery design crosses the embroidery frame so that the embroidery design does not fit in the embroidery frame. In this case, the processing proceeds to step 77 in which an "error" display of a predetermined soft frame is displayed.

If, on the contrary, there is no bit (dot) in which logical product condition is satisfied at all, this means that the embroidery design does not cross the embroidery frame so that the embroidery design fits in the embroidery frame. In this case, therefore, the processing proceeds to step 78 in which an "OK" of a predetermined soft frame is displayed.

After step 77 or 78, the processing returns to the main routine.

In a case where the automatic judgement is not made, steps 75–78 may be omitted and the processing may return to the main routine after YES of step 73. Further, if the visual confirmation of the design pattern and frame pattern is omitted while performing the automatic judgement, processings of steps 64–72 may be omitted.

In the above described embodiment, in the soft frame limit processing routine, preparation of design graphic pattern data for each stitch is made and, simultaneously therewith, display of pattern corresponding to the design graphic pattern data thus prepared is also made. The present invention, however, is not limited to this but design graphic pattern data which has already been prepared (already stored) may be read from the design graphic pattern memory GPM1 and displayed. In this case, plural types of graphic pattern data of embroidery design may be stored in the design graphic pattern data memory GPM1 and one of them may be selectively read out and displayed. In the case of the frame graphic pattern data also, frame graphic pattern data which has already been prepared (already stored) may be read from the frame graphic pattern memory GPM2 and displayed. In this case, plural types of graphic pattern data of the embroidery frame may be stored in the frame graphic pattern memory GPM2 and one of them may be selectively read out and displayed.

The program for preparing the frame graphic pattern data consisting of bit pattern on the basis of "frame data" may be omitted and, instead, memory means for prestoring graphic pattern data corresponding to the embroidery frame may be provided and graphic pattern data of a desired embroidery frame may be read from this memory means and displayed. The memory means in this case is not limited to a RAM bit but it may be a ROM or external memory such as paper tape and magnetic disc. The case is the same with the embroidery design.

As means for displaying the graphic pattern, not only electric and electronic devices such as CRT display and LED display but also hard copy devices such as a printer may be used.

In the above described embodiment, devices for displaying or judging embroidery design and frame shape according to the present invention are incorporated integrally in the automatic embroidering machine but these devices may be separately provided and attached to the ready-made automatic embroidering machine.

An embodiment capable of storing and displaying control data representing characteristics of the respective embroidery designs in correspondence to stitch data of the respective embroidery designs will now be described.

In this embodiment, the data RAM 14 stores, in addition to stitch data for realizing a desired embroidery design, control data including "design name data", "total stitch number data", "color change number data" and "maximum range data" corresponding to the desired embroidery design. Control data herein means information useful for informing an operator of characteristics of the embroidery design in some form.

Figure 17:
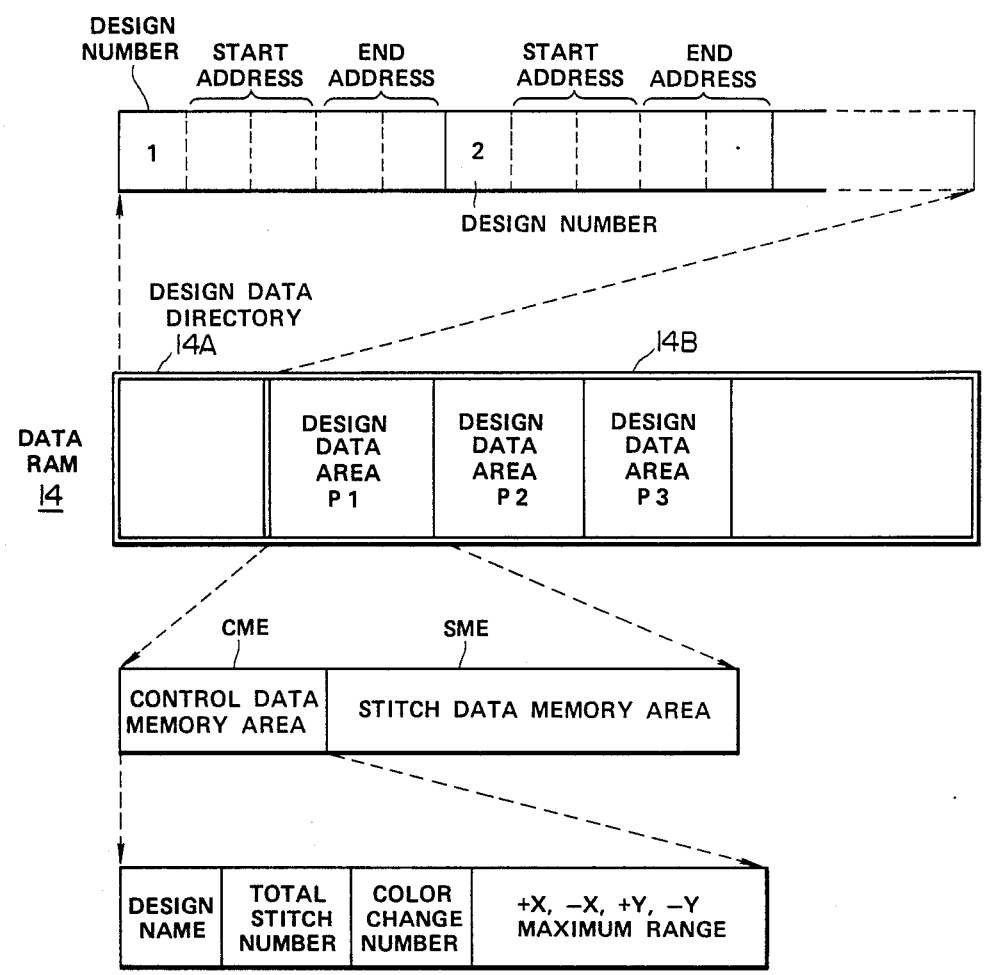
FIG. 17 is a diagram showing an example of a memory map of a data RAM in FIG. 2 when control data is stored in the data RAM in connection with still another embodiment of the invention.

FIG. 17 shows an example of a memory map of the data RAM 14 in the case of storing control data. The data RAM 14 generally consists of a design data directory 14A and a design data memory section 14B. The design data memory section 14 can store design data corresponding to plural types of embroidery designs. In the design data memory section 14, design data areas P1, P2 and P3 (assuming that there are three types of registered design data) storing the respective data in correspondence to the registered design data are defined. The area in the design data memory section 14B is left blank. The design data directory 14A stores data designating memory areas of the respective registered design data in the design data memory section 14B (i.e., respective design data areas P1, P2, P3 . . . ).

The design data directory 14A stores, with respect to the respective design data areas P1, P2 and P3 registered in the design data memory section 14B, their design numbers, start addresses (i.e., head addresses of the areas P1, P2, P3 . . . ) and end addresses (last addresses of the areas P1, P2, P3 . . . ). The design numbers are numbers which are set as desired like "1", "2", "3", . . . for the respective areas P1, P2, P3, . . . and used for distinguishing design data which have been registered. When a desired design number has been set by data input during registration, a directory corresponding to this design number is opened in the design data directory 14A. When a desired design number has been designated by data input during reading out, the start address corresponding to this design number is read from the design data directory 14A and one of the design data areas P1, P2, P3 . . . corresponding to this design number is identified thereby and accessed to this area.

The respective data areas P1, P2, P3 . . . consist of a control data memory area CME and a succeeding stitch data memory area SME. The control data memory area CME stores control data according to the present invention. The stitch data memory area SME stores stitch data for realizing a desired embroidery stitch. The control data memory area CME has memory areas for storing various control data such as, in this embodiment, "design name data", "total stitch number data", "color change number data" and "maximum range data". More specifically, "maximum range data" consists of "+X-axis maximum range data" and "−X-axis maximum range data", "+Y-axis maximum range data" and "−Y-axis maximum range data". The stitch data memory area SME stores, for each stitch, known stitch data (i.e., data relating directly to the embroidering operation such as X, Y data designating the position of the embroidery frame and function data designating operations of the embroidering machine including color change, stopping of the main shaft of the embroidering machine, jump etc.). The memory size of the control data memory area CME is constant regardless of the embroidery design but the memory size of the stitch data memory area SME differs depending upon the embroidery design (i.e., in accordance with the number of stitches of the embroidery design).

Next, operations corresponding to the control device among operations executed by the automatic embroidering machine of FIG. 2 under the control of the microcomputer will be described with reference to the flow charts of FIGS. 18a and 18b.

Figure 18A:
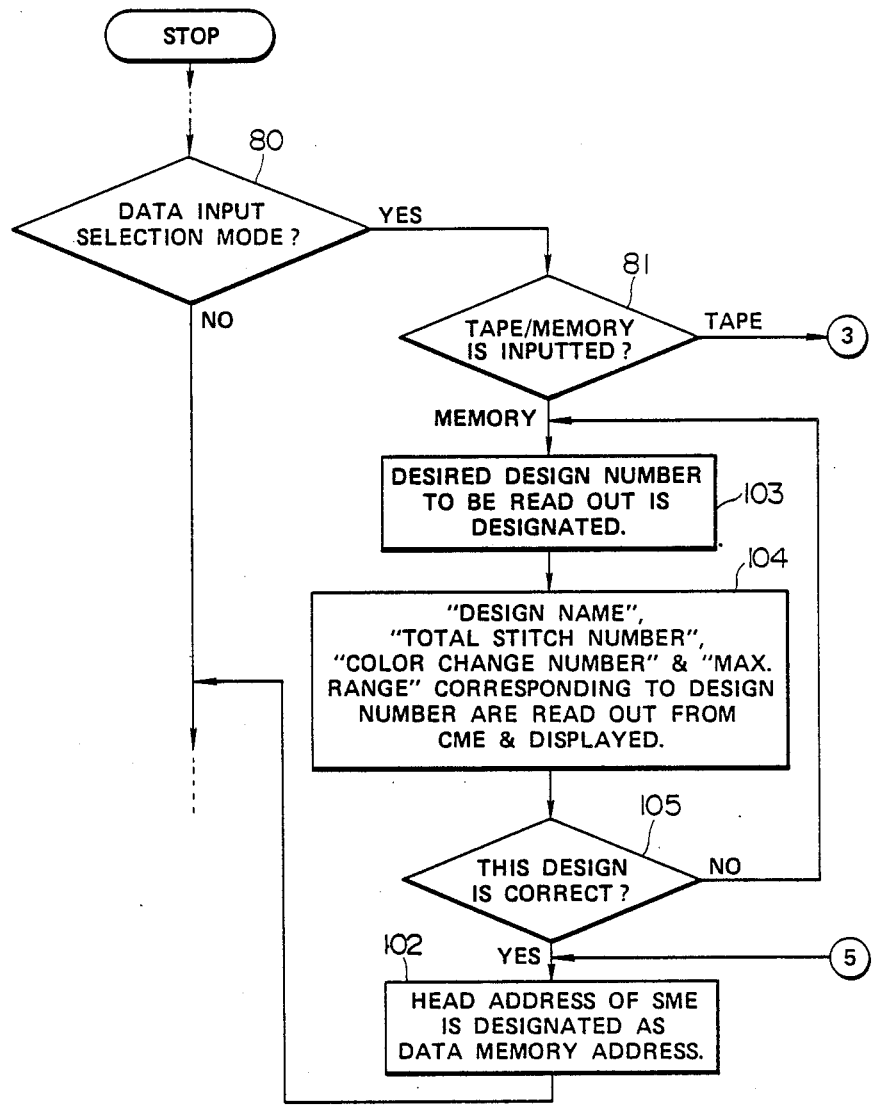
FIGS. 18a and 18b are flow charts showing an example of embroidering machine main shaft stop routine in the main routine in the program executed by the microcomputer in FIG. 2.
Figure 18B:
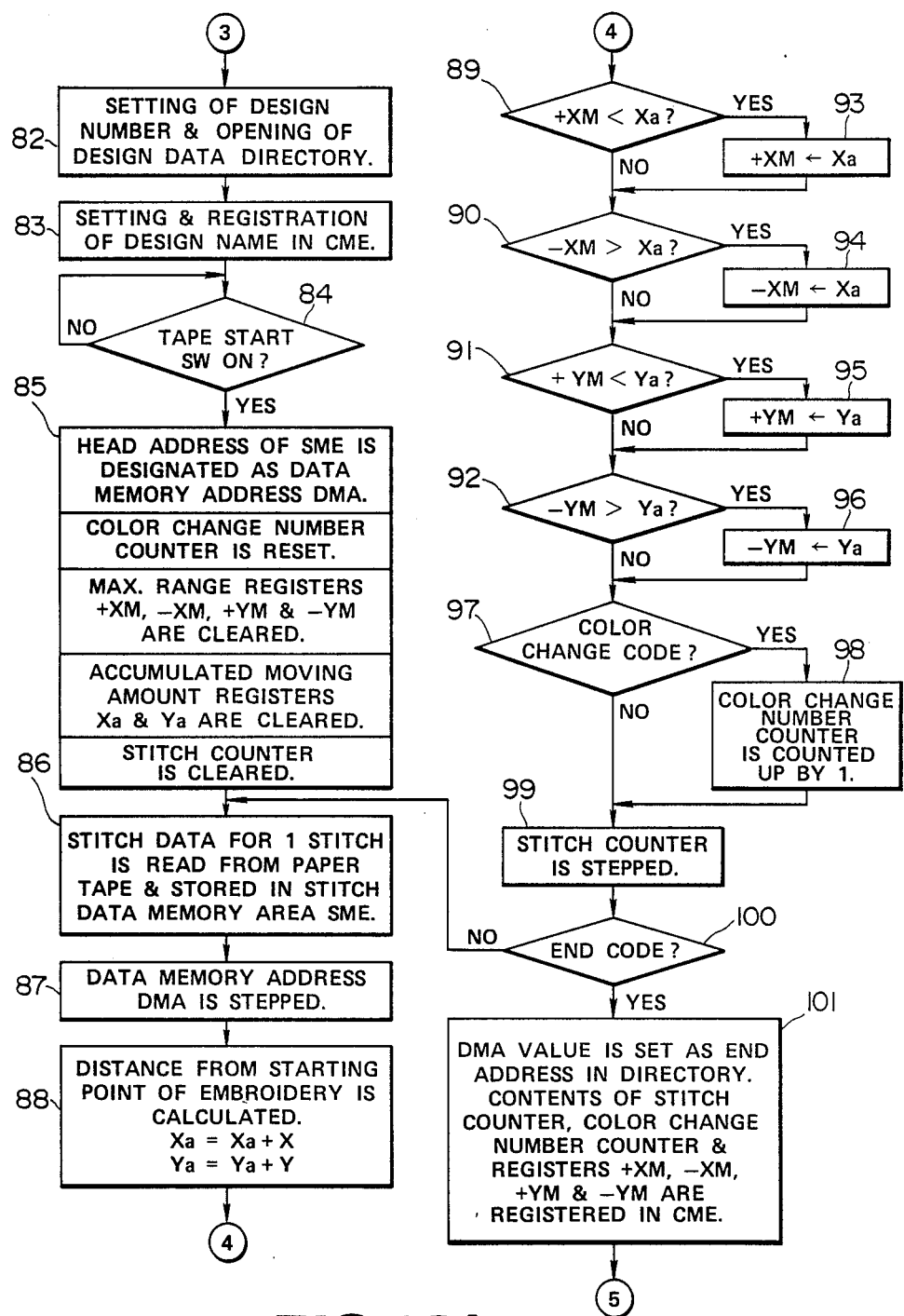

FIGS. 18a and 18b show data input setting processing which is included in step shown in FIG. 8.

In the program mode, if the function switch F1 is turned on when the function display as shown in FIG. 3 is being made by the display section DPY2, "data input setting mode" is selected and the data input setting processing shown in FIGS. 18a and 18b is executed.

Upon selection of "data input selection mode", step 80 of FIG. 18a becomes YES and the processing proceeds to step 81 in which judgement as to whether paper tape data should be loaded or reading from the design data area in the data RAM 14 should be made is performed. The selection as to whether paper tape data should be loaded or reading from the design data area in the data RAM should be performed is made by operation of the function switches F1-F6 in a condition in which contents of display in the display section DPY2 are changed to the tape/memory selection mode.

In the case of loading paper tape data, the processing first proceeds to step 82 (FIG. 18b) in which setting of a desired design number and opening of a directory corresponding to the design number in the design data directory 14A are performed. The setting of the design number is made by inputting a desired number by operation of the ten key switch TKY. In this case, design numbers of registered design data and design numbers of unregistered design data are preferably displayed by the display DPY so that a desired design number will be selected from the design numbers of unregistered design data. The set and inputted design number data are stored in the design data directory 14A. Simultaneously, start address of the design data area corresponding to this design number is decided on by the computer and this start address is stored in the design data directory 14A in correspondence to the storage of the design number data. Thus, the directory corresponding to the design number which has been set and inputted is opened in the design data directory 14A.

Figure 19:
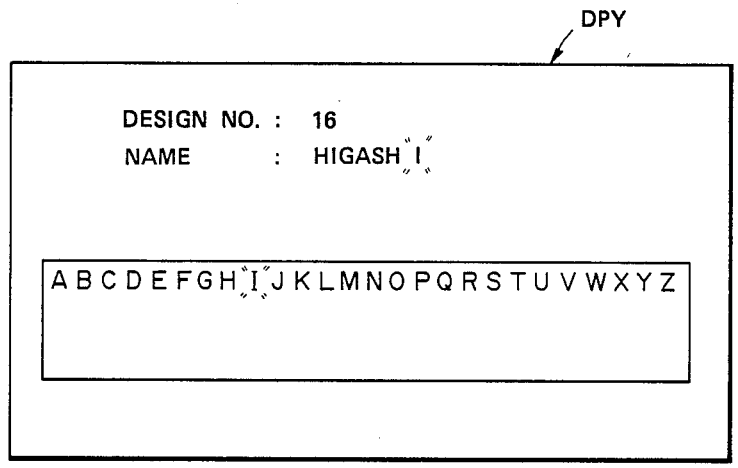
FIG. 19 is a diagram showing an example of display in the display device during setting and inputting of design name data.

In next step 83, setting and registration of the design name are made. Setting and inputting of a desired design name are made by operation of the ten key switch TKY and the display DPY. FIG. 19 shows an example of display by the display DPY. In the uppermost stage, the design number which has been selected and set by the processing of the preceding step is displayed. In the lower stage, letters constituting the name (design name) which is currently being set are displayed and the further lower stage is a letter search section consisting of 26 Alphabet letters and Japanese Katakana characters. By positioning the cursor in the letter search section at a position of a desired letter by operation of a key for cursor function in the ten key switch TKY and switching on the step key SW6, the letter at the cursor position is displayed in the name of the upper stage. By selecting a desired letter one by one in this manner and, upon completion of the desired name, the set key SW7 is turned on. This completes setting and inputting of the desired design name data and this data is stored in the design name data memory position in the control data memory area CME in the design data area corresponding to the design number in the design data memory section 14B. Thus, setting and registration of the design name data is completed. The design data area corresponding to the design number can be identified by the start address data in the directory corresponding to the design number opened in the preceding step. As the cursor in the letter search section in the display DPY, a letter corresponding to the cursor position may be intermittently lighted instead of providing a particular cursor display means.

In next step 84, whether or not the tape start switch has been turned on is examined and standby state continues until the switch is turned on. The operator sets paper tape 17 of a desired embroidery design to the paper tape reader 16 and, upon completion of setting, he turns on the tape start switch. Upon turning on of the tape start switch, the processing proceeds to step 85. The tape start switch is provided by either assigning standby to any of the function switches F1-F6 or providing a switch for exclusive use on the operation panel 15.

In step 85, first of all, the head address of the stitch data memory area SME corresponding to the design number which is currently being processed is designated as write address (data memory address DNA) in the data RAM 14. This head address can be identified by start address data in the directory corresponding to the design number and the memory size of the control data memory area CME which is previously known.

Further in this step 85, a color change number counter in the working RAM 13 is reset. Further, a +X-axis maximum range register +XM, -X-axis maximum range register -XM, +Y-axis maximum range register +YM and -Y-axis maximum range register -YM are cleared. Further, an X-axis accumulated moving amount register Xa and a Y-axis accumulated moving amount register Ya (they are also provided in the working RAM 13) storing accumulated moving amounts in X and Y axes of the embroidery frame are also cleared.

In next step 86, stitch data for one stitch (X, Y data and function data) recorded on the paper tape 17 is read by the paper tape reader 16 and the read stitch data for one stitch is written in the address in the data RAM 14 designated by the data memory address DMA (this is initially designated to the head address of the stitch data memory area SME corresponding to the design number by the processing in the preceding step 85).

In next step 87, data memory address DNA is stepped by one stitch.

In next step 88, the value of X data among the stitch data for one stitch read by the paper tape reader 16 is added to the contents of the X-axis accumulated moving amount register Xa and the value of Y data among the stitch data is added to the contents of the Y-axis accumulated moving amount register Ya whereby the contents of the respective registers Xa and Ya are renewed by the results of the respective additions. As is known, X, Y data for one stitch of the embroidery frame has values of positive and negative signs. In the registers Xa and Ya, therefore, X, Y moving amounts of the embroidery frame for each stitch are cumulatively added or subtracted and data representing accumulated moving amounts from the embroidery starting point at each stitch are stored in the X and Y axis accumulated moving amount registers Xa and Ya.

In next steps 89 and 90, contents of the X-axis accumulated moving amount register Xa are compared respectively with contents of the +X-axis maximum range register +XM and contents of the -X-axis maximum range register -XM and, if "+XM<Xa" is satisfied, the contents of Xa are registered in +XM (step 93) whereas if "-XM>Xa" is satisifed (step 95), the contents of Xa are reigstered in -XM (step 94).

In next steps 91 and 92, contents of the Y-axis accumulated moving amount register Ya are compared respectively with contents of the +Y-axis maximum range register +YM and contents of the -Y-axis maximum range register -YM and, if "+YM>Ya" is satisfied, the contents of Ya are registered in +YM (step 95) whereas if "-YM>Ya" is satisfied, the contents of Ya are registered in -YM (step 96).

In the foregoing manner, accumulated moving amounts from the embroidery start point at the furthest stitches in +X-axis direction, -X-axis direction, +Y-axis direction and -Y-axis direction from the embroidery start point are finally (i.e., when the processings concerning all stitches have been completed) registered respectively in the maximum range registers +XM, -XM, +YM and -YM. Thus, the maximum range data registered in the respective maximum range registers +XM, -XM, +YM and -YM represent the range (breadth) of the embroidery design and these data are used for purposes such as judging where the embroidery should be started for fitting the embroidery design within the embroidery frame.

In next step 97, whether or not the contents of the function data among the stitch data for one stitch read by the paper tape reader 16 in the preceding step 86 are the color change code is checked. If the contents are the color change code, the contents of the color change number counter are counted up by one (step 98).

In next step 99, the contents of the stitch counter are stepped and a next stitch is designated.

In next step 100, whether or not the contents of the function data among the stitch data for one stitch read by the paper tape reader 16 in the preceding step 86 are the end code representing completion of the embroidery design is checked. If the contents are not the end code, the processing returns to step 86 and steps 86-100 which are similar to the processings described above are repeated with respect to a next stitch designated by the stitch counter.

Upon completion of loading of stitch data of all stitches in the stitch data memory area SME corresponding to the design number, the function data becomes the end code and the processing proceeds to step 101.

In step 101, the current value of the data memory address DMA is registered as the end address data in the directory corresponding to the design number in the design data directory 14A. The maximum range data for the respective axes stored in the maximum range registers +YM, -YM, +YM and -YM are stored as "+X-axis maximum range data", "-X-axis maximum range data", "+Y-axis maximum range data" and "-Y-axis maximum range data" in the "maximum range data" memory area in the control data memory area CME corresponding to the design number. Further, the contents of the stitch counter are stored in the memory area of "total stitch number data" in the control data memory area CME corresponding to the design number. Further, the contents of the color change number counter are stored as "color change number data" in the memory area of "color change number data" in the control data memory area corresponding to the design number.

In the foregoing manner, in registering stitch data for realizing a desired embroidery design in the data RAM 14, desired "design name data" corresponding to the embroidery design is manually set and registered in the control data memory area CME (the processing of step 83), and, in accordance with the contents of the stitch data, "total stitch number data", "color change number data" and "maximum range data" are respectively set by automatic arithmetic operation and these data are registered in the control data memory area CME (steps 88-101). In this manner, in the control data memory area CME corresponding to the stitch data memory area SME storing stitch data corresponding to the desired design, various control data representing characteristics of the embroidery design, i.e., arbitrarily named "design name data" and "total stitch number data", "color change number data" and "maximum range data" corresponding to the contents of the embroidery design are set and registered.

After step 101, the processing proceeds to step 102 (FIG. 18a). In step 102, the data RAM 14 is changed to the readout mode and the head address in the stitch data memory area SME corresponding to the currently selected design number is designated as its readout address (data memory address DMA).

Thereafter, the processing returns to the main routine of the stop routine (FIG. 8) in which other processings during stoppage of the embroidering machine are performed.

Next, reading of the control data will be described. When control data which has already been registered is to be read from the control data memory area CME and displayed by the display DPY for confirmation of its contents, data input setting mode is selected in the program mode (YES of step 80) and "memory input" is selected after changing the mode to the tape/memory selection switch mode (YES of step 81) so that reading of embroidery stitch data from the data RAM 14 is selected. This causes the processing to proceed from YES of step 80 to step 81 and further to step 103.

In step 103, a desired design number to be read out is designated by key input of the ten key switch TKY.

Figure 20:
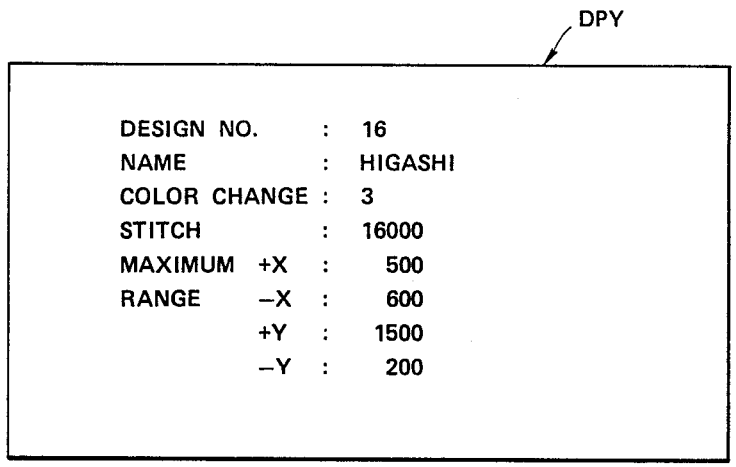
FIG. 20 is a diagram showing an example of control data in the display device during reading of the control data.

In next step 104, control data, i.e., "design name data", "total switch number data", "color change number data" and "maximum range data", registered in the control data memory area CME corresponding to the design number designated in the preceding step are read from the control data memory area CME and displayed by the display DPY. An example of contents of these control data in the display DPY is shown in FIG. 20. The operator watches this display and judges whether the embroidery design to be stitched is correct or not. If it is correct, the set switch SW5 is turned on. In step 105, whether or not this embroidery design is correct, i.e., whether or not the set switch SW5 has been turned on, is judged. If this step is YES, the processing proceeds to step 102 in which preparation for reading out stitch data from the stitch data memory area SME is made. If step 105 is NO, the processing returns to step 103 and a processing for confirming and displaying contents of control data concerning another design number is executed.

In the above described embodiment, setting of "design name data" can be made only during loading of the paper tape data but setting and changing of the design name may be made also during other time than loading of the paper tape data.

In a case where contents of "total stitch number data", "color change number data" and "maximum range data" have previously been known, these data may be manually set.

The control data set and registered in the data RAM 14 may be conserved and recorded in paper tape or other external memory together with corresponding stitch data.

As display means for displaying control data, not only quartz display but also electric and electronic devices such as CRT display and LED display or a hard copy device such as a printer or a voice generation device may be used.

In the above described embodiment, the control device according to the invention is incorporated integrally in the automatic embroidering machine. Alternatively, the control device may be attached to the ready-made automatic embroidering machine as a separate unit.

Next to be described is an embodiment in which, as the embroidering operation proceeds during the running mode, a partial embroidery design of an embroidered portion is successively displayed.

Figure 21:
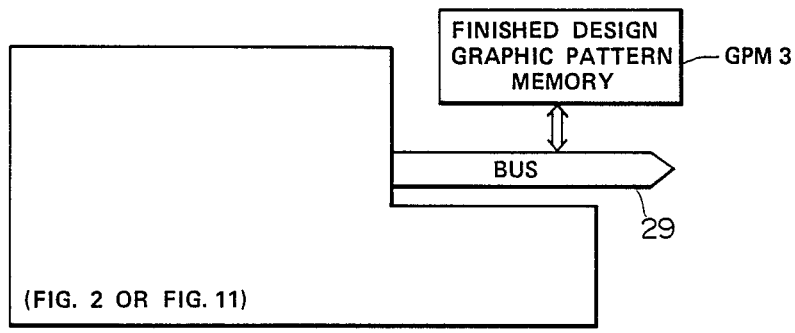
FIG. 21 is a block diagram showing a hardware structure which schematically shows a control system of still another embodiment of the automatic embroidering machine according to the invention.

In this embodiment, in FIG. 11 or FIG. 12 showing the hardware structure, a finished design graphic pattern memory GPM3 as shown in FIG. 21 is added. This finished design graphic pattern memory GPM3 stores, during the embroidering operation, graphic pattern data of a portion in which embroidering has been finished. This graphic pattern memory GPM3 consists, for example, of a RAM. The address input and data input and output of this memory GPM3 are connected to the CPU (FIG. 2) through a bus 29.

Figure 22A:
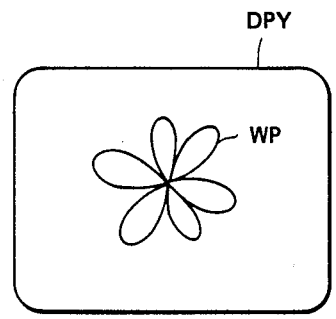
FIGS. 22a–22c are diagrams showing examples of display of an embroidery design.
Figure 22B:
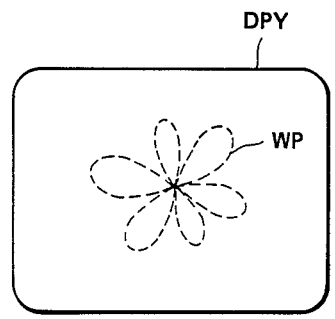
Figure 22C:
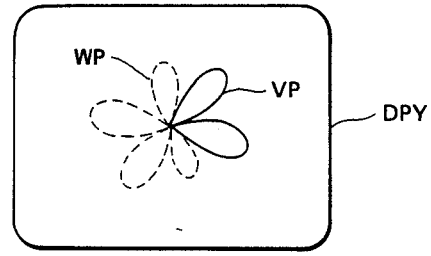

In this embodiment, examples of graphic display of an embroidery design in the display DPY are shown in FIGS. 22a-22c. With reference to these figures, an example of processings for graphically displaying the embroidery design will be described.

In starting the embroidering operation, a desired embroidery design to be embroidered is selected and stitch data (X, Y data and function data for each stitch) of that embroidery design is read from the data RAM 14. The above described arithmetic operation is performed in accordance with the read out stitch data to prepare coordinate data of a pattern of continuous stitch line of the entire embroidery design (i.e., raster scan data) and the prepared data is stored in the graphic pattern memory GPM1 as graphic pattern data of the entire design. The graphic pattern data stored in this graphic pattern memory GPM1 is read out and supplied to the display DPY for displaying pattern WP of the entire embroidery design. An example of this entire embroidery design pattern display is shown in FIG. 22a.

In the foregoing manner, in starting the embroidering operation, the entire pattern WP of the design to be embroidered is displayed and informed to the operator. Then, the entire embroidery design graphic display in the display DPY is changed to light color (in the case of single color display, half tone, i.e., a color of low brightness). An example of graphic display in this case is shown in FIG. 22b.

After starting the embroidering operation, each time embroidering of one stitch is made, operation for converting stitch data of each stitch, particularly X, Y data, to graphic coordinate data in the display DPY (i.e., luster scan data in the CRT display) is performed in accordance with the same operation formula as described previously for obtaining coordinate data of the pattern of the stitch line (i.e., raster scan data). Coordinate data of the pattern of the stitch line at the particular stitch (raster scan data) is prepared and this data is stored in the finished design graphic pattern memory GPM3 as graphic pattern data of the design in a finished portion. The graphic pattern data of the finished design pattern stored in the memory GPM3 is read out and supplied to the display DPY for displaying, in the display DPY, pattern VP of the finished design portion with the entire design pattern WP which has already been displayed. An example of this display is shown in FIG. 22c. In this case, the pattern VP of the finished design portion has preferably a tone of color which is different from the entire design pattern WP (in the case of single color display, a deep color, i.e., color of high brightness). The pattern VP of the finished design portion is gradually broadened as the embroidering operation advances.

In FIG. 22, the pattern VP of the finished design portion is displayed in a form superposed on the entire design pattern WP. Alternatively, these patterns may be displayed separately. Alternatively again, the pattern VP of the finished design portion only may be displayed.

Next, operations concerning the present invention among operations executed by the automatic embroidering machine of FIG. 21 under the control of the microcomputer will be described with reference to the flow charts of FIG. 23 and subsequent figures.

Figure 23:
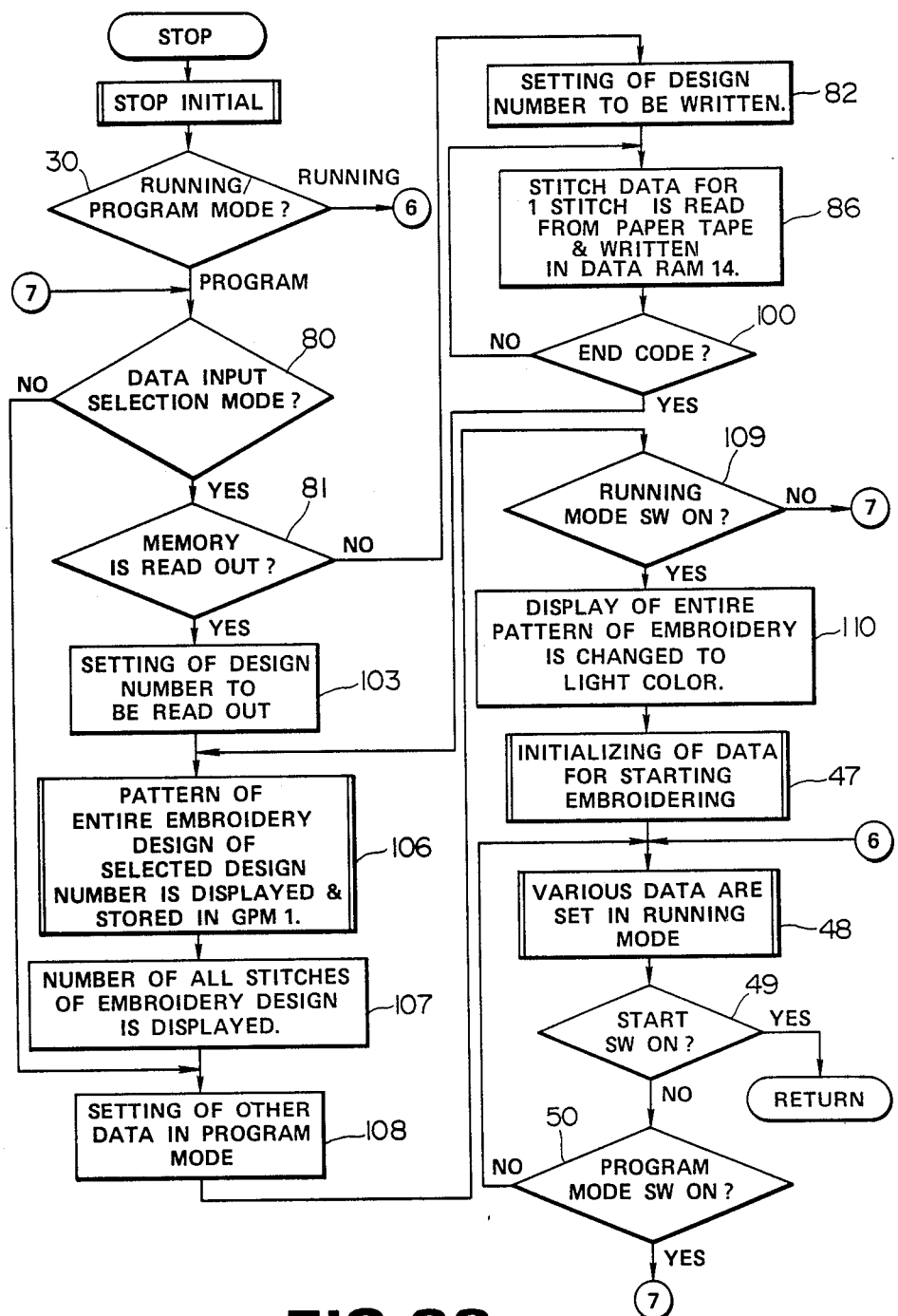
FIG. 23 is a flow chart showing an example of embroidering machine main shaft stop routine in the main routine in the program executed by a microcomputer in FIG. 21.

FIG. 23 shows an example of embroidering machine main shaft stop routine. In steps 30, 47, 48, 49 and 50, the same processings as the steps of the same reference numerals are executed. In steps 80, 81, 82, 86, 100 and 103, processings of the substantially same contents as those in the steps of the same reference numerals are executed.

In a case where desired stitch data is to be read from an external memory device such as paper tape and transmitted to the data RAM 14 for storage therein, the processing proceeds from NO of step 81 to step 82 in which a desired design number is set and inputted. By repeating step 86, stitch data of each stitch is successively read from the paper tape 17 and stored in the data RAM 14. Thereafter, the processing proceeds to step 106.

On the other hand, upon selection of reading data of the desired embroidery design from the data RAM 14, the processing proceeds from step 81 to step 103 in which the design number corresponding to the desired embroidery design to be read from the data RAM 14 is set and inputted.

In next step 106, stitch data of each stitch of the embroidery design corresponding to the selected design number is read from the data RAM 14, graphic pattern data of the entire embroidery design pattern is prepared by performing an operation for obtaining coordinate data of the pattern at each stitch line in accordance with the read out stitch data, and this graphic pattern data is stored in the design graphic pattern memory GPM1 and also supplied to the display DPY for displaying the pattern of the entire embroidery design. In other word, in this step, the processing for displaying the entire embroidery design pattern WP as shown in FIG. 22a is executed. Details of this step 106 are the same as the processings of steps 37-45 in FIG. 9. This display of the entire embroidery design pattern is continued in response to the output of this memory GPM1 even after the end of step 106.

In next step 107, the number of all stitches of the embroidery design corresponding to the selected design number is counted and stored and also displayed in the display DPY with the design pattern WP. This display of the entire stitch number also is continued.

In step 108, setting of other data in the program mode is made.

In step 109, whether or not the running mode switch is ON is examined. If the result is NO, the processing proceeds to step 80 in which the processing of the program mode is repeated.

Upon turning on of the running mode switch, the operation mode is changed from the program mode to the running mode. Upon changing to the running mode, the processing proceeds to step 110 in which the color of the entire pattern of the embroidery design displayed in the display DPY is changed to a light color. The example of this display is shown in FIG. 22b. Then, the processing proceeds to routine of the above described steps 47-50.

Upon turning on of the start switch, the processing proceeds to running routine (FIG. 7). An example of the running routine is shown in FIG. 24.

Figure 24:
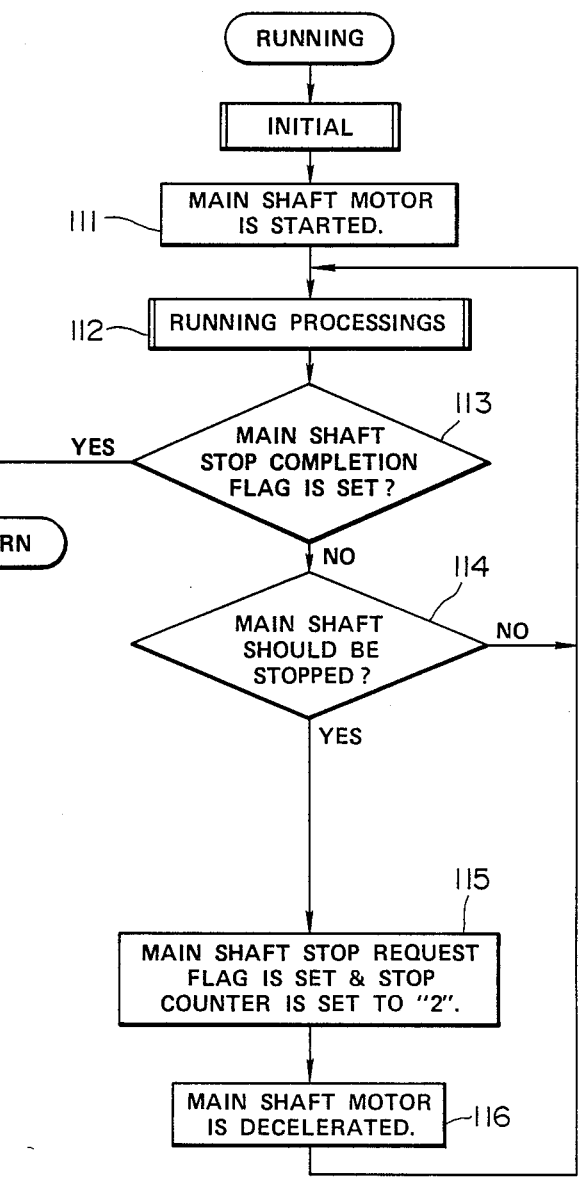
FIG. 24 is a flow chart showing an example of embroidering machine main shaft running routine in the main routine.

In FIG. 24, a predetermined initial processing of the running routine is executed and thereafter the main shaft motor 22 is started (step 111) and the running processings for the embroidering operations are executed (step 112).

In next step 113, whether or not an embroidering machine main shaft stop completion flag is set is examined. If the flag is set, step 113 becomes YES and unillustrated processings during the stop mode are executed and thereafter the processing returns to the main routine (when color changing processing has been performed however, the processing proceeds to the start of the running routine). If the flag is not set, this step 113 becomes NO and the processing proceeds to step 114.

In step 114, whether or not the embroidering machine main shaft stop condition has been satisfied is examined. If the start/stop switch 26 is the stop switch ON state or shortage of thread has occurred, it is judged that the main shaft should be stopped. If contents of the function data are the color change code or the end code representing completion of the embroidery design, it is judged that the main shaft should be stopped. When step 114 is YES, the processing proceeds to step 115 and when step 114 is NO, the processing proceeds to step 112.

In step 115, an embroidering machine stop request flag is set and the stop counter is set to numerical value "2" and the processing proceeds to next step 116.

In step 116, the embroidering machine main shaft motor 22 is decelerated and then the processing proceeds to step 112.

Figure 25:
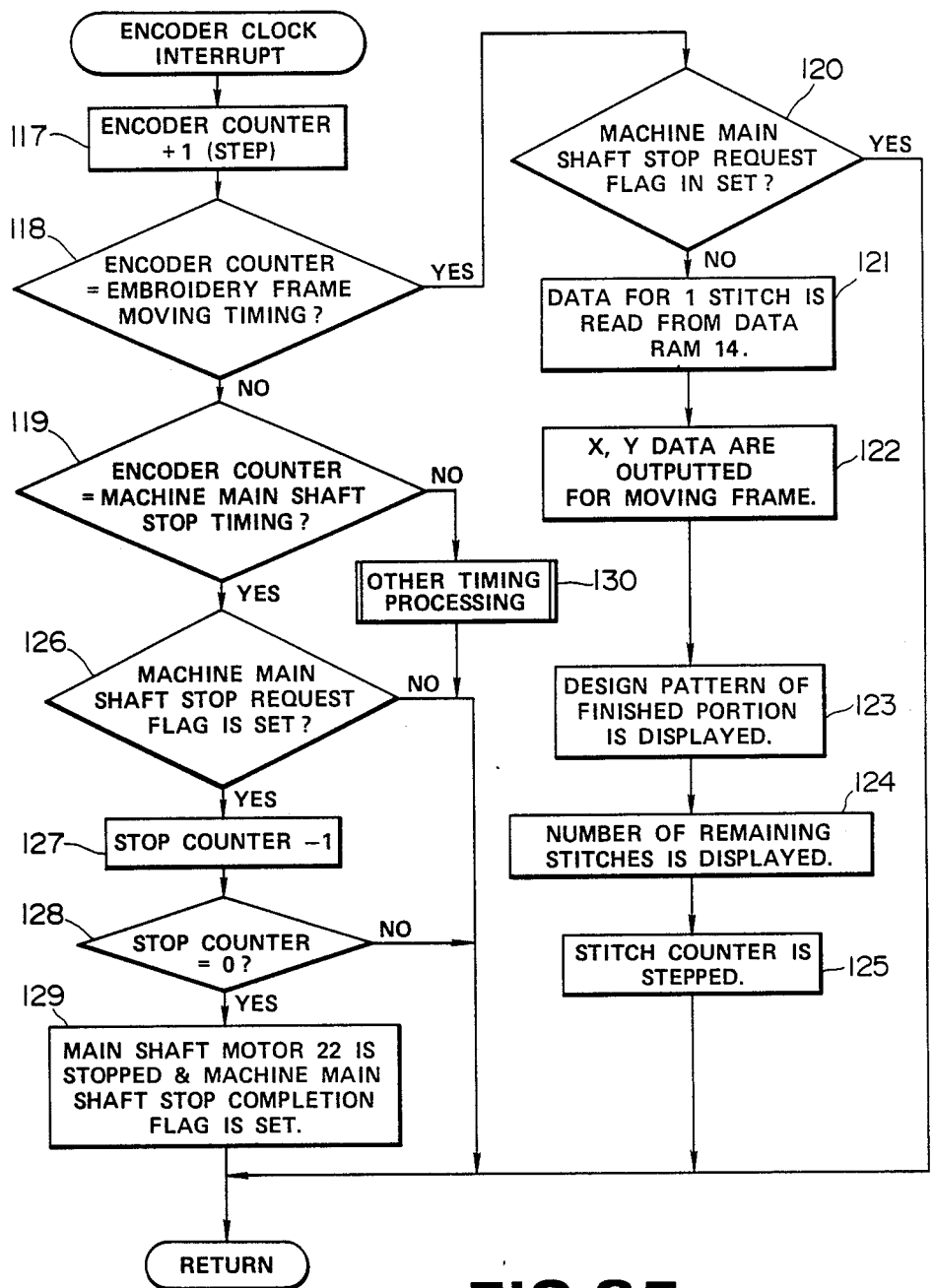
FIG. 25 is a flow chart showing an example of encoder clock interrupt subroutine executed in the embroidering machine main shaft running routine of FIG. 24.

If a clock signal is supplied from a rotary encoder 24 during the main shaft running routine, encoder clock interrupt subroutine as shown in FIG. 25 is executed.

In the encoder clock interrupt subroutine, an encoder counter is counted up by 1 (step 117) and, thereafter, which processing timing the count value corresponds to is successively judged (steps 118, 119) and processings corresponding to the respective timings are performed. If the timing is the embroidery frame moving timing, whether or not the embroidering machine main shaft request flag is set is examined (step 120). If the result is YES, the processing returns whereas if the result is NO, the processing proceeds to step 121 in which X, Y data and function data corresponding to the current stitch are read from the data RAM 14 in response to the output of the stitch counter. Then, a command for moving the embroidery frame 20 in the X and Y directions is produced in response to the X, Y data (step 122).

In next step 123, coordinate data of a pattern of the first stitch corresponding to the X, Y data are computed and the coordinate data are stored in the finished design graphic pattern memory GPM3 and, in response to the output of the memory GPM3, the design pattern of the finished portion is displayed by the display DPY. An example of this display is shown in FIG. 22c. The design pattern VP of the finished portion differs from the design pattern WP of the unfinished portion in brightness or coloring so that the state of progress of the embroidering can be visually confirmed.

In next step 124, 1 is cumulatively subtracted from the entire stitch number concerning the embroidery design to obtain the remaining number of stitches and this remaining number of stitches is displayed with the design patterns VP and WP by the display DPY. In other words, the entire stitch number displayed by the display DPY at the start of the embroidering operation as described before is reduced one by one as the embroidering operation is actually carried out. Therefore, the state of progress of the embroidering operation can be confirmed also by this display of the remaining number of stitches.

In next step 125, the stitch counter is stepped to a next stitch and the processing returns to the running routine.

If the timing is the embroidering machine main shaft stop timing, whether or not the embroidering machine main shaft stop request flag is set is examined (step 126). If the result is YES, the stop counter is counted down by 1 count and whether or not the count value has been reduced to zero is judged (steps 127 and 128). If the count value has been reduced to zero, the embroidering machine main shaft motor 22 is stopped and the embroidering machine main shaft stop completion flag is set (step 129). The jump control and other processings are executed by other timing processing (step 130).

A will be readily understood, instead of displaying the number of remaining stitches in the above step 124, both the number of finished stitches and the number of all stitches concerning the embroidery design may be displayed.

By the display of the number of remaining stitch or the display of both the number of finished stitches and the number of all stitches concerning the embroidery design, current position of process of the embroidering operation in the entire embroidery design can be known and, accordingly, the graphic display may only be the design pattern VP of the finished portion.

in the above embodiment, display of information concerning the amount of finished embroidery or the amount of remaining embroidery in the entire amount of embroidery of the embroidery design is made by a specific number of stitches. The present invention, however, is not limited to this but any display method may be used so long as current position of progress of the embroidery operation in the entire amount of embroidery can be confirmed. The amount of embroidery displayed may be a rough figure.

In each of the above embodiments, the display DPY may be constructed of not only a CRT display or quartz display but electric or electronic device such as LED display or plasma display or a hard copy device such as a printer.

Further, the device according to the present invention is not limited to one based on the software processing as in the above described embodiments but it may be constructed of a hardware device exclusively used for this purpose.

As described above, according to the present invention, graphic pattern data of an embroidery design corresponding to stitch data for realizing the embroidering operation is prepared and the embroidery operation is displayed on the basis of this embroidery design. Accordingly, the embroidery design corresponding to stitch data stored in a memory can be confirmed in a visual form which is most readily understandable without the necessity for the operator to remember the embroidery design or perform the embroidery operation.

Again, according to the present invention, the shape of the embroidery frame used for the embroidering operation is displayed simultaneously with displaying of the embroidery design to be embroidered. Accordingly, whether or not the embroidery design can fit in the embroidery frame can be instantly detected by comparing the displayed embroidery design and embroidery frame so that whether or not the embroidery design fits in the embroidery frame can be judged without the necessity of actually performing the embroidering operation.

Further, according to the present invention, as the embroidering operation advances, the embroidery design of finished portion is graphically displayed so that the state of progress of the embroidering operation can be informed to the operator in a simple manner during the embroidering operation.

Further, according to the invention, in correspondence to stitch data for realizing the embroidering operation, control data representing characteristics of the embroidery design corresponding to the stitch data is stored and displayed so that the embroidery design corresponding to the stitch data stored in the memory can be readily detected without the necessity for the operator to remember the embroidery design or actually perform the embroidering operation.

What is claimed is:
1. An embroidering machine comprising:
stitch data memory means storing stitch data for realizing an embroidering operation corresponding to a desired embroidery design;
means for reading out the stitch data from the stitch data memory means and executing the embroidering operation in accordance with the read out stitch data;
graphic pattern data supply means for supplying, in correspondence to an embroidery design stored in said stitch data memory means, graphic pattern data of the pattern of the embroidery design;
display means for displaying the embroidery design pattern in accordance with the graphic pattern data supplied by the graphic pattern data supply means; and
second graphic pattern data supply means for supplying, as the embroidering operation advances, graphic pattern data of a finished portion of the embroidery design, and in which said display means displays, in accordance with outputs of said graphic pattern data supply means and said second graphic pattern data supply means, the entire pattern of the embroidery design and a pattern of the actually finished portion of the embroidery design together.

2. An embroidering machine as defined in claim 1 wherein said graphic pattern data supply means reads out the stitch data stored in said stitch data memory means and produces the graphic pattern data of the embroidery design pattern realized by the stitch data in accordance with the stitch data.

3. An embroidering machine as defined in claim 2 wherein said graphic pattern data supply means comprises operation means for producing the graphic pattern data of the embroidery design pattern realized by the stitch data in accordance with the stitch data read from said stitch data memory means and graphic pattern data memory means for storing the graphic pattern data produced by this operation means.

4. An embroidering machine as defined in claim 1 wherein said graphic pattern data supply means comprises means for setting a scale ratio of the graphic pattern data to be supplied and the graphic pattern data is generated and displayed at the set scale ratio.

5. An embroidering machine as defined in claim 1 wherein said graphic pattern data supply means comprises graphic pattern data memory means for storing, in correspondence to the stitch data stored in said stitch data memory means, the graphic pattern data of the embroidery design pattern realized by the stitch data, graphic pattern data corresponding to desired stitch data being read from said graphic pattern data memory means and the embroidery design pattern being displayed in accordance with the read out graphic pattern data.

6. An embroidering machine as defined in claim 1 which further comprises frame graphic pattern data supply means for supplying frame graphic pattern data for graphically displaying the shape of an embroidery frame and in which said display means displays the embroidery design pattern and the embroidery frame shape in accordance with the graphic pattern data of the embroidery design supplied by said graphic pattern data supply means and the frame pattern data supplied by said frame graphic pattern data supply means whereby whether or not the embroidery design pattern fits in the embroidery frame can be detected by comparison of the embroidery design pattern and the embroidery frame shape respectively displayed by said display means.

7. An embroidering machine as defined in claim 1 wherein said display means displays the entire pattern of the embroidery design and the pattern of the finished portion of the embroidery design by common coordinates, one being superposed upon the other, distinguishing the finished portion from the unfinished portion by different brightness or coloring.

8. An embroidering machine comprising:
stitch data memory means storing stitch data representing each individual stitch for realizing an embroidering operation corresponding to a desired embroidery design;
means for reading out the stitch data from the stitch data memory means and executing the embroidering operation in accordance with the read out stitch data;
graphic pattern data supply means for supplying, in correspondence to an embroidery design stored in said stitch data memory means, graphic pattern data of the pattern of the embroidery design;
display means for displaying the embroidery design pattern in accordance with the graphic pattern data supplied by the graphic pattern data supply means;
frame graphic pattern data supply means for supplying frame graphic pattern data for graphically displaying the shape of an embroidery frame; and
judging means for comparing the graphic pattern data of the embroidery design supplied by said graphic pattern data supply means and the frame graphic pattern data supplied by said frame graphic data supply means so as to judge whether or not the embroidery design pattern fits in the embroidery frame.

9. An embroidering machine as defined in claim 8 wherein said frame graphic pattern supply means comprises frame shape data memory means storing frame shape data representing the shape of the embroidery frame and frame graphic pattern data production means for reading out the frame shape data stored in this frame shape data memory means and producing frame graphic pattern data graphically displaying the shape of the embroidery frame in accordance with the frame shape data.

10. An embroidering machine as defined in claim 9 wherein said frame graphic pattern data production means comprises operation means for performing an operation for producing the graphic pattern data of the embroidery frame in accordance with the frame shape data read from said frame shape data memory means and frame graphic pattern data memory means for storing the frame graphic pattern data produced by this operation means.

11. An embroidering machine as defined in claim 9 wherein said frame graphic pattern data production means comprises means for setting scale ratio of the graphic pattern data produced and produces and displays the graphic pattern data at the set scale ratio.

12. An embroidering machine including stitch data memory means for storing stitch data for realizing an embroidering operation corresponding to a desired embroidery design and means for reading out the stitch data from this stitch data memory means and executing the embroidering operation in accordance with the read out stitch data characterized in that said embroidering machine comprises:
control data memory means for storing control data representing characteristics of an embroidery design corresponding to the stitch data stored in said stitch data memory means;
setting means for setting the control data to be stored in this control data memory means;
reading means for reading out the control data from said control data storing means; and
display means for displaying the read out control data;
wherein said setting means comprises manual setting means for manually setting a predetermined type of control data among plural types of control data as desired and automatic setting means for automatically setting another predetermined type of control data among the plural types of control data in accordance with the contents of the stitch data corresponding to the other predetermined type of control data by performing a predetermined operation.

13. An embroidering machine as defined in claim 12 wherein said control data includes at least one of design name data representing the name of the embroidery design, data representing the number of stitches in the embroidering design, data representing the number of times of color change in the embroidery design and data representing maximum range from an embroidery starting point in the embroidery design.

14. An embroidering machine as defined in claim 12 wherein said stitch data memory means stores the stitch data corresponding to plural embroidery designs,
 said control data memory means stores the control data for each of the embroidery designs stored in said stitch data memory means; and
 said reading means selectively reads out the control data corresponding to a desired one of the embroidery designs from said control data memory means.

* * * * *